US011186896B2

(12) United States Patent
Douglas

(10) Patent No.: US 11,186,896 B2
(45) Date of Patent: Nov. 30, 2021

(54) SELECTIVE SEPARATION OF ELEMENTS OR COMMODITIES OF INTEREST IN AQUEOUS STREAMS

(71) Applicant: Commonwealth Scientific and Industrial Research Organisation, Acton (AU)

(72) Inventor: Grant Brian Douglas, Perth (AU)

(73) Assignee: COMMONWEALTH SCIENTIFIC AND INDUSTRIAL RESEARCH ORGANISATION, Acton (AU)

( * ) Notice: Subject to any disclaimer, the term of this patent is extended or adjusted under 35 U.S.C. 154(b) by 312 days.

(21) Appl. No.: 15/566,430

(22) PCT Filed: Apr. 15, 2016

(86) PCT No.: PCT/AU2016/050282
§ 371 (c)(1),
(2) Date: Oct. 13, 2017

(87) PCT Pub. No.: WO2016/164986
PCT Pub. Date: Oct. 20, 2016

(65) Prior Publication Data
US 2018/0119252 A1 May 3, 2018

(30) Foreign Application Priority Data
Apr. 15, 2015 (AU) .............................. 2015901349

(51) Int. Cl.
*C22B 60/02* (2006.01)
*C02F 1/42* (2006.01)
(Continued)

(52) U.S. Cl.
CPC ............ *C22B 60/0252* (2013.01); *C02F 1/42* (2013.01); *C22B 3/04* (2013.01); *C22B 3/12* (2013.01);
(Continued)

(58) Field of Classification Search
CPC ........ C02F 1/42; C02F 2001/422; C22B 3/04; C22B 60/02; C22B 60/0252; G21F 9/04; G21F 9/12; Y02P 10/234
See application file for complete search history.

(56) References Cited

U.S. PATENT DOCUMENTS 6,028,023 A * 2/2000 Vierheilig ................ B01J 21/10
  502/84
6,365,661 B1 * 4/2002 Fischer .................... C08K 7/00
  524/445

(Continued)

FOREIGN PATENT DOCUMENTS

WO  WO 2007/112509 A1  10/2007
WO  WO 2010/105303 A1  9/2010
(Continued)

OTHER PUBLICATIONS

Hsu, L.C. et al. "The removal and recovery of Cr(VI) by Li/Al layered double hydroxide." 2007. Journal of Hazardous materials. 142. p. 242-249. (Year: 2007).*
(Continued)

*Primary Examiner* — Nicholas A Wang
(74) *Attorney, Agent, or Firm* — Crowell & Moring LLP

(57) ABSTRACT

A process for selectively separating a metallic constituent from other metals and other materials accompanying the metallic constituent in a mixture is described. The process comprises the step of providing the mixture in an aqueous solution such that the metallic constituent forms a complex anion in the solution. One or more of the other metals forms a cation or a complex cation in the solution. Another step includes contacting the solution with one or more additives to form layered double hydroxide (LDH) material in situ such that the complex anion is intercalated within interlayers of the LDH material and wherein one or more of the other metals are incorporated into the LDH material's crystal
(Continued)

structure or matrix. Another step involves the addition of an LDH to an aqueous solution. The process involves selectively recovering the metallic constituent from the interlayer of the LDH by subjecting the LDH to a recovery treatment step(s) and as required, methods to modify the LDH to facilitate metal separation and recovery or contaminant stabilisation.

21 Claims, 12 Drawing Sheets

(51) Int. Cl.
$C22B\ 3/12$ (2006.01)
$C22B\ 3/04$ (2006.01)
$G21F\ 9/04$ (2006.01)
$G21F\ 9/12$ (2006.01)

(52) U.S. Cl.
CPC .............. *C22B 60/02* (2013.01); *G21F 9/04* (2013.01); *G21F 9/12* (2013.01); *C02F 2001/422* (2013.01); *Y02P 10/20* (2015.11)

(56) References Cited

U.S. PATENT DOCUMENTS

2010/0279848 A1* 11/2010 Iyi .................. B01D 53/62 502/11
2012/0228229 A1* 9/2012 Douglas ................. C01F 7/005 210/662

FOREIGN PATENT DOCUMENTS

WO WO 2011/107667 A1 9/2011
WO WO 2016/164958 A1 10/2016

OTHER PUBLICATIONS

Activeminerals. "Attapulgite." 2014. http://activeminerals.com/products/attapulgite. (Year: 2014).*

International Search Report and Written Opinion for International Patent Application No. PCT/AU2016/050282, dated Jul. 12, 2016 (9 pages).

Xiaofei Zhang et al., "Removal of Uranium (VI) from Aqueous Solutions by Magnetic Mg—Al Layered Double Hydroxide Intercalated with Citrate: Kinetic and Thermodynamic Investigation,"Colloids and Surfaces A: Physicochemical and Engineering Aspects, vol. 414, (2012) pp. 220-227.

Li, Songnan, et al., "In Situ Grown Of Nano-Hydroxyapatite on Magnaetic CaA1-Layered Double Hydroxides and Its Application in Uranium Removal," *Chemical Engineering Journal*, 193-194 (2012) pp. 372-380.

Liang, Xuefeng, et al., "Sorption of Metal Cations on Layered Double Hydroxides," *Colloids and Surfaces: Physicochem. Eng. Aspects*, 433 (2013) pp. 122-131.

European Search Report dated Sep. 17, 2018 for European Application No. 16779346.2, 10 pages.

* cited by examiner

SELECTIVE SEPARATION OF ELEMENTS OR COMMODITIES OF INTEREST IN AQUEOUS STREAMS

CROSS-REFERENCE TO RELATED APPLICATIONS

This application is a National Stage of International Application No. PCT/AU2016/050282 filed with the Australian Patent Office on Apr. 15, 2016, which claims priority to Australian patent application No. 2015/901,349 filed Apr. 15, 2015, wherein the entirety of each of the aforementioned applications is hereby incorporated herein by reference.

TECHNICAL FIELD

The present disclosure relates to selectively separating elements or commodities from aqueous streams. In particular, the disclosure relates to selectively separating a soluble metallic constituent from other soluble metals and other materials accompanying the metallic constituent in a mixture.

BACKGROUND ART

Extraction of metallic constituents such as uranium from its ores is commonly carried out by processes which include leaching the ore or a concentrate thereof. The process of leaching yields a solution which contains both uranium and other commodities and impurities. It is often difficult to separate uranium from a mixture that contains other commodities and impurities such as rare earth elements.

Aqueous streams such as mineral processing/metallurgical streams that result from one or more processes including leaching or chemical extraction in acidic, neutral or alkali reagents may often contain a range of elements (as ions, molecules, complexes etc.) that may be considered both as commodities and contaminants in the form of metals and metalloids (e.g. As, Cd, Cr, Se, Tl, radionuclides). In addition, where seawater, saline surface or groundwaters are used as part of the extraction or treatment process, they may contain a range of other cations (e.g. $Na^+$, $Ca^{2+}$) or anions (e.g. $Cl^-$, $SO_4^{2-}$) or one or more cationic, anionic or neutral additives introduced during the process (e.g. surfactants, complexing moieties, other organic or inorganic compounds) that may be considered problematic or deleterious in terms of optimisation of element extraction, recovery or purification in subsequent processes (e.g. ion exchange, dissolution, precipitation).

Therefore, it is desirable to provide a process for selective separation of one or more constituents of the aqueous streams such as the streams described above.

Layered double hydroxides (LDH) are a class of both naturally occurring and synthetically produced materials characterised by a positively-charged mixed metal hydroxide layers separated by interlayers that contain water molecules and a variety of exchangeable anions. LDH is most commonly formed by the co-precipitation of divalent (e.g. $Mg^{2+}$, $Fe^{2+}$) and trivalent (e.g. $Al^{3+}$, $Fe^{3+}$) metal cation solutions at moderate to high pH.

An LDH compound may be represented by the general formula (1):

  (1)

where $M^{2+}$ and $M^{3+}$ are divalent and trivalent metal ions, respectively and $A^{n-}$ is the interlayer ion of valence n. The x value represents the proportion of trivalent metal ion to the proportion of total amount metal ion and y denotes variable amounts of interlayer water.

Common forms of LDH comprise $Mg^{2+}$ and $Al^{3+}$ (commonly known as hydrotalcites [HT]) and $Mg^{2+}$ and $Fe^{3+}$ (known as pyroaurites), but other cations, including Ni, Zn, Mn, Ca, Cr and La, are known. The amount of surface positive charge generated is dependent upon the mole ratio of the metal ions in the lattice structure and the conditions of preparation as they affect crystal formation.

The formation of HT (the most commonly synthesised LDH frequently with carbonate as the principal "exchangeable" anion) may be most simply described by the following reaction:

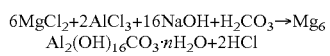

Typically, ratios of divalent to trivalent cations in Hydrotalcites vary from 2:1 to 4:1. Other synthetic pathways to form HT (and other LDH) include synthesis from $Mg(OH)_2$ (brucite) and MgO (calcined magnesia) via neutralisation of acidic solutions. This can be described by the following reaction:

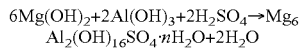

A range of metals of widely varying concentrations may also be simultaneously co-precipitated, hence forming a polymetallic LDH. HT or LDH were first described over 60 years ago. Sometimes, they can also occur in nature as accessory minerals in soils and sediments. Layered double hydroxides may also be synthesised from industrial waste materials by the reaction of bauxite residue derived from alumina extraction (red mud) with seawater, as described by the following reaction:

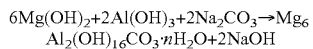

or by the reaction of lime with fly ash derived from fossil fuel (e.g. coal fired power stations).

Within the LDH or HT structure there are octahedral metal hydroxide sheets that carry a net positive charge due to limited substitution of trivalent for divalent cations as described above. As a consequence, it is possible to substitute a wide range of inorganic or organic anions into the LDH or HT structure. These anions are often referred to as "interlayer anions" as they fit between the layers of hydroxide material. Layered double hydroxides are generally unstable below a pH of approximately 5 but may act as buffers over a wide range of solution pH. Layered double hydroxides or HT, and in particular those that contain carbonate as the predominant anion, have also been demonstrated to have a considerable capacity to neutralise a range of mineral acids via consumption of both the hydroxyl and carbonate anions contained within the LDH structure.

A number of studies have been conducted to investigate ways to exploit the anion exchange properties of LDH. These studies have focused on the removal of phosphate and other oxyanions and humic substances from natural and wastewater(s). Phosphate is one of the many anions that may be exchanged into the interlayer space in LDH. Laboratory studies of phosphate uptake using synthetically prepared Mg—Al HT and a range of initial dissolved phosphate concentrations indicate an uptake capacity of from ca. 25-30 mg P/g to ca. 60 mg P/g with uptake also influenced by initial phosphate concentration, pH (with maximum phosphate absorption near pH 7), degree of crystallinity and the HT chemistry. A major obstacle to the use of HT for phosphate removal in natural and/or wastewaters is the selectivity for carbonate over phosphate, with a selectivity series in the approximate order $CO_3^{2-}$>$HPO_4^{2-}$>>$SO_4^{2-}$, $OH^-$>$F^-$>$Cl^-$>$NO_3^-$. Many HT are also synthesised with carbonate as the predominant anion and thus require anion exchange before they are exposed to phosphate. When carbonate is also combined with sulphate, nitrate and chloride (as might commonly occur in natural or wastewaters) the reduction of phosphate absorption to the HT is further decreased.

A number of recent studies have focused on the formation and study of synthetic LDH or specifically HT or similar and their subsequent reactivity to a range of anions, particularly silicate with a view to forming polymetallic aluminosilicates, which as potential precursors to clay materials, are thought to limit metal mobility and bioavailability. A potential also exists for the co-precipitation of silicate and aluminate anions as another precursor of analogue of clay minerals.

Thus, other structural elements or interlayer ions may be incorporated (both inorganic and organic) to assist in both substitution and/or incorporation of ions from solution and/or increased stability. Subsequent formation of chlorite- or phyllosilicate-like minerals from pure Mg—Al or predominantly Mg—Al HT which may be similar to the HT, or iso-chemical in composition when compared to the HT, or may possess a similar chemistry as the HT with substitution of some ions as determined by the nature of Mg and/or Al added or the nature and chemical composition of the natural or wastewater which may influence the final geochemical composition, crystallinity or mineralogy.

This increased stability of LDH or HT or chlorite-like minerals or other LDH or HT derivatives may also be achieved possibly in combination with chemical methods described above by partial or complete evaporation, calcination or vitrification leading to part or complete dehydration and partial/total recrystallisation. The use of co-amendments with, or encapsulation of, the LDH or HT may also be an option to further increase physical or chemical stability.

The International Atomic Energy Agency (which is the international centre of cooperation in the nuclear field working with member states and multiple partners worldwide to promote safe, secure and peaceful nuclear technologies) published a report in 2004 summarising the state of the art in the field of treatment of effluents from uranium mines and mills. Importantly, the report omits any reference to one or more processes whereby the addition of chemical compounds to modify solution chemistry to form LDH or HT for the treatment of effluents from uranium mines.

Throughout this specification, the word "comprising" and its grammatical equivalents is to be taken to have an inclusive meaning unless the context of use indicates otherwise.

It will be clearly understood that, if a prior art publication is referred to herein, this reference does not constitute an admission that the publication forms part of the common general knowledge in the art in Australia or in any other country.

SUMMARY

In a first aspect, the disclosure provides a process for selectively separating a soluble metallic constituent from other soluble metals and other materials accompanying the metallic constituent in a mixture, the process comprising:

(a) providing the mixture in an aqueous solution such that the metallic constituent forms a complex anion in the solution and wherein one or more of the other metals forms a cation or a complex cation in the solution;

(b) contacting the solution with one or more additives to form layered double hydroxide (LDH) material in situ such that the complex anion is intercalated within interlayers of the LDH material and wherein one or more of the other metals are incorporated into the LDH material's crystal structure or matrix; and (c) selectively recovering the metallic constituent from the interlayer of the LDH by subjecting the LDH from step (b) to a recovery treatment step.

In a second aspect, the disclosure provides a process for selectively separating a metallic constituent from one or more of other metals and other materials accompanying the metallic constituent in a mixture, the process comprising:

(a) providing the mixture in an aqueous solution such that the metallic constituent forms a complex anion in the solution and wherein one or more of the other metals forms a cation or a complex cation in the solution;

(b) contacting the solution with a layered double hydroxide (LDH) material such that the complex anion is intercalated within interlayers of the LDH material; and (c) selectively recovering the metallic constituent from the interlayer of the LDH by subjecting the LDH from step (b) to a recovery treatment step.

In a third aspect, the disclosure provides a process for selectively separating uranium from rare earth elements and other materials in a mixture, the process comprising:

(a) providing the mixture in an aqueous solution such that uranyl complex anions are present in the solution;

(b) contacting the solution with one or more additives to form layered double hydroxide (LDH) material in situ;

(c) such that the uranyl complex anion is intercalated within interlayers of the LDH material and wherein one or more of the rare earth elements is incorporated into the LDH material's crystal structure or matrix; and (d) selectively recovering uranium from the interlayer of the LDH by subjecting the LDH from step (b) to a recovery treatment step.

In a fourth aspect, the disclosure provides a process for selectively separating uranium from rare earth elements and other materials in a mixture, the process comprising:

(a) providing the mixture in an aqueous solution such that uranyl complex anions are present in the solution;

(b) contacting the solution with LDH material such that the uranyl complex anion is intercalated within interlayers of the LDH material and wherein one or more of the rare earth elements is incorporated into the LDH material's crystal structure or matrix; and (c) selectively recovering uranium from the interlayer of the LDH by subjecting the LDH from step (b) to a recovery treatment step.

Throughout the specification, a skilled person may understand that incorporation of the one or more metals into the crystal structure or matrix of the LDH material non-exclusively refers to incorporating the said metal(s) as a building block of the crystal structure of the LDH material and does not refer to mere adsorption of materials on the surface of the LDH material.

The term "aqueous solution" as used herein refers to all of the waters, other liquids or solutes or solvents or mixtures whether miscible or immiscible and solids such as but not limited to mineral processing/metallurgical streams and electronic waste (e-waste) streams that result from one or more processes including leaching or chemical extraction in acidic, neutral or alkali reagents. The aqueous solution may contain a range of chemical species (as ions, molecules, complexes, micelles, aggregates, particulates or colloids and so forth). The aqueous solution may also contain a plurality of metals, metalloids, lanthanide or rare earth elements (REE), actinides, transuranic metals and radionuclides, any one of which may be regarded as a commodity or a contaminant.

The term "metallic constituent" particularly but not exclusively encompasses metallic species capable of forming complex anions in aqueous solutions described herein. Suitable examples of metallic constituents include, but are not limited to, uranium, vanadium, thorium, chromium, and some transuranic metals. capable of forming complex anions in aqueous solutions. The metals referred to herein also include rare earth elements (REE) (15 metallic elements with atomic numbers ranging from 57 to 71). The REE are often described as part of the Lanthanide series and, for convenience, from time to time are represented as $Ln^{3+}$. Other examples of suitable metals include but are not limited to radionuclides or transuranics capable of being present in aqueous solution in the 3+ oxidation state.

The term "transuranic" will be used herein to refer to chemical elements with atomic numbers greater than 92 (the atomic number of uranium). All of these elements are unstable and decay radioactively into other elements. The term "transuranic" may be taken as a reference to transuranic metal species or transuranyl metal species.

It will be appreciated by persons skilled in the art that although some transuranic metals may be present in aqueous solution in the 3+ oxidation state (e.g. $Am^{3+}$ and $Cm^{3+}$), these and other transuranic metals may alternatively be present in solution as transuranic cations (e.g. $AmO_2^{2+}$ and $PuO_2^{2+}$), depending on one or more characteristics of the aqueous solution such as pH, ionic strength, presence and concentration of one or more ligands, oxidation state of the transuranic metals and so forth. Transuranic cations are capable of forming transuranic complex anions with one or more ligands such as $CO_3^{2-}$ or $SO_4^{2-}$ in a similar manner to uranyl cations.

The embodiments described herein provide an improved process for precipitating a range of elements from aqueous solutions such as process waters/metallurgical solutions which is particularly advantageous in separating or differentiating a mixture of elements or contaminants of interest within the LDH material. The embodiments utilise the different uptake mechanisms and behaviours of LDH materials (irrespective of whether the LDH material is formed in situ or is added to the aqueous solution) to efficiently separate or differentiate or partition a mixture of elements and contaminants.

It is recognised that cations such as metal cations may be incorporated into the metal oxide layers of the LDH that forms the crystal structure or matrix. The applicant has also recognised that some metallic constituents, particularly metals such as uranium (vanadium or chromium or some transuranic metals in further embodiments) may exist as large sized oxy-cations such as $UO_2^{2+}$ that cannot be accommodated into the crystal structure or matrix. The applicant has discovered that by tailoring or controlling reaction conditions such as pH conditions and/or addition of reaction agents etc., such large size oxy-cations such as $UO_2^{2+}$ may be utilised for preferentially forming one or more complex anion species such as any of $UO_2(CO_3)_2^{2-}$, $UO_2(CO_3)_3^{4-}$, $CaUO_2(CO_3)_3^{2-}$, $UO_2^{2+}$—$SO_4$. For example, at lower pH that $UO_2^{2+}$—$SO_4$ complexes (e.g. $UO_2(SO_4)_3^{4-}$) may predominate while at intermediate to higher pH $UO_2^{2+}$—$CO_3^{2-}$ anionic complexes (e.g. $UO_2(CO_3)_2^{2-}$, $UO_2(CO_3)_3^{4-}$, $CaUO_2(CO_3)_3^{2-}$) may predominate. Given this speciation of the uranyl ion ($UO_2^{2+}$) as anionic complexes, these anionic complexes preferentially partition into the anionic interlayers of the LDH material. Therefore, if the aqueous solution comprises a mixture of metals such as Cu, Mn, Ni, Pb, Zn and rare earth elements (REE; 15 metallic elements with atomic numbers ranging from 57 to 71; The REE are often described as part of the Lanthanide series and, for convenience, from time to time be represented as $Ln^{3+}$) and uranium, the process would separate the uranium from the remaining metals, metalloids and rare earth elements by preferentially forming uranyl complex anionic complexes which would be intercalated into the interlayer of the LDH whereas at least some of the metals and rare earth elements would be incorporated into the crystal structure of the LDH. For example, REE as predominantly $Ln^{3+}$ cations (Ce as +3 and +4 and Eu and +2 and +3 oxidation states) are strongly partitioned into the primary metal hydroxide layer of LDH materials substituting for other +3 cations such as Al and Fe. As a result of the process described herein, REE are for example contained within the metal hydroxide layers of the LDH and valuable uranium is contained as anionic complexes within the LDH interlayers.

Some embodiments also result in the formation of an LDH material that typically may contain in excess of 30% U and 0-50% REE. Such resulting quantities of uranium and rare earth metals is typically 100-300 times higher than typical ore grades of these elements thus allowing substantial enrichment of the commodities of value. Another significant benefit afforded by some embodiments is that the process results in effective separation of potentially problematic ions such as Na, Cl and $SO_4$ or other additives or components from the mineral processing or aqueous stream, thus potentially facilitating simpler processing, further enrichment, recovery or purification). Yet another advantage is the production of a cleaner effluent that may potentially be reused in mineral processing or other site applications or other operations without (or minimal) additional treatment.

Certain embodiments may be employed to selectively separate transuranic metallic constituents and/or transuranic metals from complex mixtures comprising one or more of Pu, Np, Am and Cm in addition to U and daughter radionuclides. Advantageously, one or more characteristics of the aqueous solution or reaction conditions may be varied so that one or more transuranic elements of interest may be present in solution as a respective transuranic complex anion or a transuranic (III) cation. For example, it will be appreciated by those skilled in the art that any suitable redox reaction or disproportionation reaction may be employed to yield the desired transuranic and non-transuranic ion of appropriate oxidation state in solution, and that the resulting metal cations or anions may then be reacted with one or more ligands to produce a desired metal cation or metal complex anion in solution capable of being incorporated or intercalated into the LDH or excluded from the LDH.

Accordingly, selective separation of one or more transuranic elements from said mixture may comprise contacting the solution with one or more additives to form layered double hydroxide (LDH) material in situ such that a transuranic complex anion formed in step a) may be intercalated within interlayers of the LDH material.

Alternatively, selective separation of one or more transuranic elements from said mixture may comprise contacting the solution with one or more additives to form layered double hydroxide (LDH) material in situ such that a transuranic (III) cation formed in step a) may be incorporated into the LDH material's crystal structure or matrix.

In alternative embodiments, selective separation of one or more transuranic elements from said mixture may comprise contacting the solution with a layered double hydroxide (LDH) material such that a transuranic complex anion formed in step a) may be intercalated within interlayers of the LDH material.

In still further embodiments, selective separation of a transuranic element from said mixture may comprise contacting the solution with one or more additives to form layered double hydroxide (LDH) material in situ or by contacting the solution with a layered double hydroxide (LDH) material such that one or more complex anions other than the transuranic element of interest formed in step a) and, optionally, one or more metal cations other than the transuranic element of interest formed in step a) is incorporated into the LDH material's crystal structure or matrix. In this particular embodiment, the transuranic element of interest may be selectively separated from the mixture by excluding it from incorporation or intercalation with the LDH material, thereby leaving it in solution for subsequent recovery.

Selective recovery steps include, but are not limited to, ion-exchange of the LDH interlayers or (partial) dissolution of the LDH to isolate specific transuranic, radionuclides or other metals. The inventor opines that the embodiments of the process as described herein may prove an effective alternative means of selective separation in comparison to existing techniques that may involve one or more sequential co-precipitation steps, ligand formation and ion-exchange.

Some embodiments also provide a method of recovering the selectively separated constituents of the aqueous solution wherein the different constituents have been taken up by the LDH by differing uptake mechanisms (for example uranium in the interlayer of the LDH, whereas REE in the crystal structure or metallic oxide layers of the LDH) by subjecting the LDH from step (b) of the first, second or third aspects to a further recovery treatment step. The various recovery treatment steps that may be utilised have been detailed in the foregoing passages of the present specification.

In some embodiments, the process comprises the recovery of the LDH from the aqueous stream before subjecting the separated LDH from step (b) to step (c) of the process described herein. Such recovery of the LDH may be carried out by recovery means such as sedimentation, flocculation or filtration.

It may be appreciated that in some further aspects, the aqueous stream may also be contacted with pre-formed LDH material wherein at least a part of the total quantity of LDH material in the process is formed in-situ.

In at least some embodiments, the step of contacting the pre-formed LDH material with the aqueous solution (as described in the second aspect and fourth aspect) comprises dissolving at least a part of the pre-formed LDH material into the solution thereby obtaining dissolved LDH in the solution. [Such dissolving of the LDH material typically results in the divalent and trivalent cations (forming the metal oxide layers of the pre-formed LDH) going into the solution as ionic species] This dissolution step is followed by controlling the reaction conditions in the aqueous solution for promoting in situ precipitation of LDH material from the dissolved LDH material such that the complex anion is intercalated within interlayers of the LDH material formed in situ and wherein one or more of the other metals are incorporated into the crystal structure or matrix of the LDH material formed in situ.

Preferably, the step of dissolving the LDH in the aqueous solution comprises controlling the pH of the aqueous solution, preferably at pH levels of less than 7 and more preferably less than 5 and even more preferably less than 3. Furthermore, the subsequent step of controlling the reaction conditions in the aqueous solution may also comprise controlling the pH of the aqueous solution preferably at a pH level of greater than 8 to promote the precipitation of the LDH material from the dissolved LDH material.

Such a process comprising initially lowering the pH of the solution for dissolving the LDH material followed by an increase in the pH for promoting reformation of LDH from the dissolved LDH may be referred to as pH cycling step. Thus in at least some embodiments, the uptake mechanism of the LDH materials relies on the dissolution and reformation of the added LDH material.

A skilled person would appreciate that dissolving the pre-formed LDH material in an aqueous solution results in dissolution of at least a part of the metal oxide layer of the LDH material into the solution which results in divalent and trivalent cations being dissolved in the solution. The subsequent step of controlling the reaction conditions results in the reformation of the LDH material by precipitation and the dissolved divalent and trivalent ions along with some of the other metals form the crystal structure or matrix and interlayer anions of the LDH material reformed in situ.

In an embodiment, the process further comprises the step of controlling the pH levels of the aqueous solution thereby controlling speciation of the complex anion. The pH conditions speciation of the anionic complexes may be suitably tailored or controlled. For example, at lower pH that $UO_2^{2+}$–$SO_4$ complexes (e.g. $UO_2(SO_4)_3^{4-}$) may be preferentially formed whereas under intermediate to higher pH conditions $UO_2^{2+}$–$CO_3^{2-}$ anionic complexes (e.g. $UO_2(CO_3)_2^{2-}$, $UO_2(CO_3)_3^{4-}$, $CaUO_2(CO_3)_3^{2-}$) may be predominately formed.

In some embodiments, the LDH from step (b) may be separated from the aqueous solution by conventional separation methods such as sedimentation and/or filtration and/or cyclonic separation or other suitable solid-liquid separation means.

The separated LDH may be treated to recover the constituents therefrom. In some further embodiments, the recovery treatment step may be carried by introducing the separated LDH to an ion-exchanging solution to cause ion-exchange to occur whereby the complex anion of the metallic constituent in the interlayer of the LDH is ion-exchanged with an anion in the ion-exchanging solution. In this manner the complex anion of the metallic solution goes into solution by carrying out the ion exchanging step. It will be appreciated that this ion-exchanging step involves the ion-exchange solution having at least one substituent anion such that the substituent anion displaces at least some of the intercalated anion or complex anion by an ion exchange mechanism thereby resulting in the anion or complex anion being released from the LDH interlayer into the ion-exchange solution. Whilst, the intercalated anion or complex anion of the metallic constituent is released from the interlayer of the LDH, the other metals (such as the REE/metals) that are present in the crystal structure or matrix of the LDH remain incorporated in the crystal structure or matrix of the LDH material.

Recovering the LDH from step (b) and then conducting an ion exchange process is particularly beneficial when the initial aqueous solution in step (a) comprises leaching solutions having high salt concentrations (such as those used in leaching processes for recovering uranium) because achieving optimal ion exchanging efficiencies in such leaching solutions such as mining waste solutions was found to be difficult. Adopting the process described in some embodiments that involves the step of separating the LDH from step (b) and as described above results in higher ion exchanging efficiencies thereby producing better separation of the intercalated metallic constituent from the LDH.

In a further embodiment, the ion exchanging step also comprises controlling pH conditions to promote displacement of the anion or complex anion from the interlayer and/or to promote speciation of a preferred type of anion or complex anion over other anions or complex anions. For example, a strong alkali may be added to displace $UO_2^{2+-}SO_4$ or $UO_2^{2+-}CO_3$ complexes by $OH^-$ anions by increasing the pH. It would be appreciated that such a recovery treatment step involves the recovery of the uranium (in the form of the uranyl complex anion) back into aqueous solution even though the REE remain incorporated in the LDH crystal structure. Alternatively, addition of a strong acid thereby reducing the pH such that charged or neutral $UO_2^{2+}$ complexes are displaced from the interlayers of the LDH is also possible. In this, sustained acid addition may also sufficiently decompose the LDH crystal structure to liberate the REE or other metals or elements.

In some embodiments, the substituent agent may comprise one or more of the following nitrilotriacetic acid (NTA), ethylenediaminetetraacetic acid (EDTA) or a range of other complexing agents such as crown ethers or other organic or (complex) inorganic ligands and/or wherein the substituent agent is substantially more electronegative relative to the intercalated complex anion in the LDH material thereby resulting in the substituent agent such as EDTA and/or NTA displacing the complex anion from the interlayer.

In a further embodiment, the recovery step further comprises separating the LDH material after the ion exchanging step is completed. It may be appreciated that separating the LDH material after the ion-exchanging step is complete results in obtaining a separated LDH material which comprises the incorporated metallic cations or REE present in the crystal structure of the separated LDH material. The incorporated metallic cations or REE from the separated LDH may be recovered by methods such as heat treatment or thermal decomposition of the separated LDH material thereby resulting in the formation of a collapsed or metastable material.

In a further embodiment, the process may include the addition of a further additive (such as silica) to the LDH material prior to or during the heat treatment or thermal decomposition. Preferably, the process may involve controlling the ratio of the further additive to the LDH material for selectively controlling formation of oxide materials upon the heat treatment or thermal decomposition.

Additives such as silica may also be added to the LDH prior to or during the heat treatment or thermal decomposition step in a range of forms including crystalline silica (e.g. quartz), amorphous or chemically-precipitated silica, silicic acid, organic forms including tetra-ethylsilica(te) or silica added to the LDH interlayers. Controlling the ratio of the silica to the LDH and/or controlling the temperature of heat treatment may result in a series of reactions between the added forms of silica and the LDH resulting in the formation of a range of materials like minerals such as (or in addition to spinel and periclase) pyroxenes such as enstatite, olivines including forsterite and other minerals including silica transformed into high temperature forms including cristobalite.

It will be appreciated that by varying the amount of silica or other elements in one or more forms relative to the LDH (by controlling the ratio of the silica to the LDH material) that different proportions or suites of minerals may form as a result of the heat treatment step. This process of including an additive as described above is particularly advantageous for two reasons. The first advantage is that secondary mineral oxides such as metallic silicates or pyroxenes may be formed that may constitute a suitable long-term repository for a range of contaminants including radionuclides. The second advantage is that given selected elements may be partitioned into materials formed as a result of the heat treatment, the materials formed (as determined by the composition of the LDH and the type and proportion of the additive) this may assist in the selective recovery of particular elements contained within selected minerals. Silica may be replaced by other additives in further embodiments and the embodiment described above is in no way limited by the addition of silica.

In some alternative embodiments, the separated LDH may be subjected to a dissolution step wherein the separated LDH is dissolved in a dissolving solvent such as an acid that results in the release of the intercalated complex anion and the metal cations from the crystal structure of the separated LDH into the dissolving solvent. Capturing the metallic species from the initial aqueous solution containing low concentrations of metallic species in the LDH material in accordance with step (b), separating the LDH material and then redissolving the separated LDH in a dissolving solvent results in obtaining a solvent with relatively higher concentration levels of the metallic species (in comparison with the low concentration levels of the initial aqueous solution). It would be appreciated that recovery of metallic species from a solution containing relatively higher concentration levels of the metallic species is more desirable and cost-effective and therefore offers the skilled person an opportunity to use conventional metallurgical recovery methods which would otherwise be ineffective for capturing trace amounts of metallic species as present in at least some embodiments of the aqueous solution utilised in step (a) of the present process. Therefore, this embodiment present a significant commercial advantage by offering a viable method or process for recovering metallic species from aqueous solutions having low concentration of the metallic species.

In an alternative embodiment of the process, ion exchange of the intercalated complex anion may not be carried out. Instead, the LDH comprising the intercalated complex anion and the incorporated one or more metals and other materials obtained from step (b) may be separated and subsequently subjected to a heat treatment process as described above. Such a heat treatment process initially results in the collapsing of the LDH material resulting in the loss of the layered structural characteristics of the LDH material and subsequently results in recrystallisation of the LDH material. Specifically, the recrystallisation of the heat treated and collapsed LDH results in formation of a first oxide material comprising the metallic constituent and a second oxide material comprising one or more of the other metals. For example, the inventor has surprisingly discovered that calcination of LDH comprising intercalated uranyl complex cations and rare earth metals incorporated in the crystal structure produce a first crystalline oxide material in the form of periclase, a spinel and a third material that incorporates a proportion of uranium and other commodities such as the REE.

In further embodiments, the heat treatment may be carried out under substantially reducing conditions for reducing the intercalated complex anion present within the interlayers of the LDH material obtained in step (b). For example, during heat treatment of LDH comprising intercalated uranyl complex anions, the heat treatment may be carried out under anoxic conditions (e.g. $N_2$) or reducing (e.g. CO or C) conditions to form reduced U mineralogy, for example to produce uraninite ($UO_2$). In some alternative embodiments, other agents may be added to form $UF_6$ as a gas phase to assist in separation and recovery of U or specific U isotopes.

In some further embodiments, the process may comprise optimisation of the crystal structure or matrix of the LDH material for selectively incorporating one or more of the other metals into the crystal structure or matrix of the LDH. For example, the optimisation may be carried out by introducing additives to the aqueous solution such as carbonates in an alkaline liquor for tuning uptake of selected or specific rare earth elements in the crystal structure or matrix of the LDH. Without being bound by theory, it is theorised that amount/speciation of bicarbonate/carbonate in the aqueous solution may potentially endow the LDH material (such as hydrotalcite) with some selectivity given the increasing affinity of mid to heavy REE for carbonates or bicarbonates.

In an embodiment, the pre-determined metallic constituent comprises uranium or vanadium and wherein the one or more of the other metals comprises REE. As described earlier, the complex anion [anion] may comprise a uranyl complex anion such as but not limited to: $UO_2(CO_3)_2^{2-}$, $UO_2(CO_3)_3^{4-}$, $CaUO_2(CO_3)_3^{2-}$ $UO_2(SO_4)_3^{4-}$, a vanadyl complex anion including but not limited to $VO_2(OH)^{2-}$, $VO_3OH^{2-}$, $V_{10}O_{28}^{6-}$, a chromium complex anion including but not limited to $Cr_2O_7^{2-}$, or a transuranic complex anion In at least some embodiments the pH of the solution determines speciation of the complex anion.

In one embodiment the intercalated complex anion may be displaced from the interlayer of the LDH by the ion exchanging step described in the earlier section by the addition of a substituent agent such as EDTA, NTA, crown ethers, etc.

In alternative embodiments, the LDH material may be subjected to the heat treatment step in accordance such that the heat treatment results in the thermal decomposition of the LDH material to recrystallise as a first crystalline oxide and a second crystalline oxide such that the uranium is incorporated in the first metal oxide and one or more of the REE is incorporated in the second crystalline oxide. Preferably the heat treatment may be carried out under substantially reducing conditions for reducing the uranyl ion from a +6 to +4 oxidation state or a mixture thereof.

In some further embodiments, the LDH material may be provided in the form of a hybrid material comprising magnetic materials and LDH. Providing magnetic LDH hybrids assists in recovering the LDH material by methods such as magnetic separation.

In some further embodiments, the LDH material may be provided in the form of a hybrid material comprising carbonaceous materials and LDH. Providing carbonaceous LDH hybrids assists in the co-recovery of precious metals by methods such as physi- or chemisorption/absorption.

In at least some embodiments, the LDH material may be separated as a solid or the dissolved components recovered and recycled for executing the process described herein.

The process described herein may be utilised as a pre-concentration step in mineral processing for elements/commodities of interest. The process may also be utilised as a method of separating elements/commodities of interest, in particular separation of a pre-determined metallic constituents as described in earlier sections from other metals and materials that may be contained in an aqueous solution or stream such as process water, leach solution (e.g. in situ or heap) or pregnant liquor.

In an embodiment of at least the first aspect the step of contacting the solution with one or more additives to form layered double hydroxide (LDH) material in situ further comprises:

(a) adding a magnesium and/or aluminium containing silicate material in the aqueous solution and dissolving at least a part of the silicate material in the solution thereby leaching at least a part of the magnesium and/or aluminium from the silicate material into the water; and (b) controlling reaction conditions for achieving an appropriate Mg:Al ratio in the solution for formation of the layered double hydroxide (LDH) in situ.

The applicants have realised that addition of magnesium and/or aluminium containing silicates such as, for example Mg-bearing sepiolite, vermiculite, attapulgite or talc or kaolinite or natural or synthetic minerals such as zeolite that may yield magnesium and/or aluminium ions into the water when at least a part of the silicate material is subjected to the dissolving step (step [c]) of the process. Without being bound by theory, it is theorised that leaching of at least some of the magnesium and aluminium ions into the water results in the leached magnesium and/or aluminium ions being taken up for formation of the LDH material in situ.

The utilisation of magnesium containing and/or aluminium containing silicate materials as a source of magnesium and/or aluminium ions for the formation of the LDH material presents several advantages.

Addition of the said silicate material to the water followed by dissolving at least a part of the silicate results in leaching of at least some of the magnesium and/or aluminium ions initially present in the silicate material. Surprisingly, however, the remaining undissolved silicate material provides nucleation sites for facilitating the formation or precipitation of the LDH material in situ thereby improving yield of the LDH formed in the water.

The undissolved silicate material also functions as an agent for increasing density and/or aggregate particle size of the LDH formed in situ thereby assisting in settling of the LDH in the water and/or dewatering or physical separation and recovery.

Another advantage presented by the process of the present embodiment is that the undissolved silicate material may also function as an additional cation or anion exchange agent in the water. This implies that in addition to the LDH material, the undissolved silicate material may contribute towards functioning as an adsorbent for ionic species dissolved in the water.

The silicate materials mentioned above may also include, but are not limited to one or more of the following: Attapulgite; Clinoptilolite; Sepiolite; Talc; Vermiculite, mineral aggregates or associations in the form of rocks (e.g. ground granite, greenstone or serpentinite), overburden, soils, sediments or waste materials, for instance from alumina refining (red mud) or coal combustion (fly ash).

In at least some embodiments, undissolved silicate material from step (a) and the LDH formed in situ in step (b) form an insoluble clay material mixture wherein the clay material mixture incorporates said at least one or more dissolved cation species and/or the one or more dissolved anion species. This mixture may be also referred to a hybrid clay mixture.

In one embodiment, the step of dissolving the magnesium and aluminium containing silicate material comprises leaching the magnesium and aluminium from the silicate material under acidic pH conditions. For example, the silicate material may be dissolved by way of introducing an acidic solution such as hydrochloric acid solution and/or sulphuric acid solution. The applicants have realised that acid treatment or acid leaching of silicate materials containing both aluminium and magnesium may result in the leaching or release of aluminium ions and magnesium ions from the silicate material into the water. Therefore, conducting the dissolving step under acidic conditions in at least some embodiments can result in leaching of magnesium and aluminium ions into the water. The leached ions may be utilised for tailoring the Mg:Al ratio and using the leached magnesium and aluminium ions as building blocks for the LDH formed in situ.

In an alternative embodiment, the step of dissolving the magnesium and/or aluminium containing silicate material comprises leaching the magnesium and/or aluminium from the silicate material under alkaline conditions. Conducting the dissolving step for silicate materials (containing both magnesium and aluminium) under alkaline conditions results in low dissolution of magnesium and comparatively higher dissolution of aluminium ions into the water. Conducting the dissolving step under alkaline conditions in at least some embodiments can result in leaching of at least the aluminium ions into the water which may be utilised for tailoring the Mg:Al ratio and using the leached aluminium ions as building blocks for the LDH formed in situ.

Furthermore, in at least some embodiments, Si may also be leached into the water as a result of the dissolving step of the process. Excessive leaching of silica can potentially occupy the interlayer anion exchange site within the LDH during formation or may combine with the leached aluminium ions to form other compounds during the LDH formation. In some embodiments, the process also comprises controlling the leaching of silica into the water.

In at least some embodiments, the step of dissolving involves agitating the silicate material in the water for leaching said at least part of the magnesium and/or aluminium from the silicate material. The agitation may be carried out by way of one or more methods such as stirring and/or ultrasonication and/or any other desirable agitation means. It is also envisaged that a series of agitation steps may be utilised for agitating the silicate materials. Agitating the silicate material results in increased leaching of the magnesium and/or aluminium ions from the silicate material into the water.

In at least some embodiments, the adding step comprises adding a mixture comprising the said magnesium and/or aluminium containing silicate material and an additional silicate material. It is important to appreciate that by carefully combining one or more magnesium and/or aluminium containing silicate materials in desired proportions, a desired divalent to trivalent ratio (Mg:Al) as required to form the LDH may be achieved. As a result, the required amount of additional Mg or Al to be added is reduced which can result in significant benefits.

In at least some embodiments, step (c) comprises adding a mixture to the solution, the mixture comprising the silicate material and an additional material such as barren overburden or rocks or mineral processing wastes or slags In further embodiments the step of controlling the reaction conditions comprises adding at least one Mg-containing compound and/or at least one Al-containing compound for achieving the appropriate Mg:Al ratio in the water for formation of the LDH in situ.

The Mg or Al dissolved in the water may comprise the leached magnesium and/or aluminium ions derived from the dissolved silicate materials and in at least some embodiments may also comprise magnesium and or aluminium ions forming a part of the dissolved cations in the water being subjected to the process described herein.

This recognises that many natural or in particular wastewaters may include dissolved magnesium and or aluminium ions. Mg ions and Al ions present in the water are taken up by the formation of LDH (containing Mg and Al as the predominant metal species in the lattice structure of the LDH). Advantageously, the LDH also can take up and largely immobilise other ions into the interlayer spaces between the lattice. Thus, other ions can also be removed from the water and largely immobilised.

For example, the said at least one aluminium containing compound may comprise aluminate ($Al(OH)_4^-$ or $AlO_2^-\cdot 2H_2O$) or aluminium sulphate, aluminium hydroxide or organometallic compounds containing aluminium.

Other inorganic compounds such as aluminium sulphate (e.g. $Al_2(SO_4)_3 \cdot 18H_2O$), aluminium hydroxide ($Al(OH)_3$) or organometallic compounds (e.g. aluminium acetylacetonate $Cl_5H_{21}AlO_6$) may also be used where a source of Al is required. Preferably these sources of Al will be alkaline to raise solution pH to an appropriate level for LDH or HT formation, but also may be used where the final solution pH or the combination of these or other compounds is alkaline.

In some embodiments it may also be necessary to add additional Mg to the water in order to adjust the ratio of Al to Mg in the water to the desired level to obtain LDH or HT containing Mg and Al as predominant metal species in a lattice. This may be achieved, for example, by adding MgO or $Mg(OH)_2$ to the water. Advantageously, MgO or $Mg(OH)_2$ also assist in obtaining desirable pH characteristics that are suitable for the formation of LDH, such as HT.

It will be appreciated that although LDH material is generally predominantly composed of $Mg^{2+}$ and $Al^{3+}$ cations, other divalent and trivalent metal cations, in particular $Fe^{2+}$ and $Fe^{3+}$ may be substituted for $Mg^{2+}$ and $Al^{3+}$, respectively in the LDH material. In embodiments where the aqueous solution is derived from leaching an ore, a concentrate, or a metallic constituent-bearing material or an alternative metallurgical process, the LDH material formed in accordance with the process described herein may also comprise $Fe^{2+}$ and $Fe^{3+}$. Accordingly, it is envisaged that in some embodiments the ratio of Al to Mg in the aqueous solution, when adjusted to the desired level to obtain LDH or HT containing Mg and Al as predominant metal species in the lattice, also takes into account the relative concentrations of Fe(II) and Fe(III) in the aqueous solution.

In some embodiments it may be necessary or desirable to add additional alkaline or acid-neutralising material in addition to the at least one Mg-containing compound or the at least one Al-containing compound to the natural or wastewater. The additional alkaline or acid neutralising material may be selected from one or more of alkaline or acid-neutralising solutes, slurries or solid materials or mixtures thereof, such as lime, slaked lime, calcined magnesia, sodium hydroxide, sodium carbonate, sodium bicarbonate or sodium silicate. This list is not exhaustive and other alkaline or acid-neutralising materials may also be added. The additional alkaline or acid-neutralising material may be added before the addition of the at least one Mg-containing compound or the at least one Al-containing compound to the natural or wastewater, together with the addition of the at least one Mg-containing compound or the at least one Al-containing compound to the natural or wastewater, or after the addition of the at least one Mg-containing compound or the at least one Al-containing compound to the natural or wastewater.

In some embodiments the order or sequence of addition of various alkalis or acid-neutralising materials to acid waters, wastewaters, slurries or process waters as described elsewhere in this specification may confer certain benefits. For example, the order of addition may confer geochemical and/or operational advantages to the neutralisation process and the formation of Layered Double Hydroxides (LDH) and other mineral precipitates.

Selective, partial or total removal of Layered Double Hydroxide (LDH) and/or other undissolved silicate materials and/or mineral precipitates or slurry components at various stages of the reactions whether via addition of various alkalis or acid-neutralising materials to acid waters, wastewaters or process waters or via addition of acid waters, wastewaters or slurries to various alkalis or acid-neutralising materials as described elsewhere in this specification may also be considered advantageous.

Such an example involves the removal of precipitates or existing solids or aggregates, mixtures or co-precipitates thereof prior to the introduction of reverse osmosis to remove some or all of remaining solutes or evaporation. This removal of Layered Double Hydroxide (LDH) and/or other mineral precipitates including the undissolved silicates at various stages of the reactions whether via addition of various alkalis or acid-neutralising materials to acid waters, wastewaters or process waters or via addition of acid waters, wastewaters or process waters to various alkalis or acid-neutralising materials as described elsewhere in this specification may be facilitated or enhanced by mechanical (e.g. centrifugation) or chemical (e.g. via addition of flocculants) means or a combination thereof In some embodiments partial or total removal of water or other solvents or miscible or immiscible solutes, such as by partial or total evaporation or distillation, may be used to increase the concentrations of one or more of dissolved, colloidal or particulate constituents or additional added constituents such as Mg and/or Al, (e.g. to tailor the appropriate Al to Mg ratio) to increase the concentration by a sufficient degree to induce the formation of LDH.

At least some embodiments are also directed to water and water streams including process waters that may contain little or no Mg and/or Al or be dominated by other dissolved cations and/or anions. (e.g. such as those derived from some acid sulphate soils, industrial processes or nuclear power plants, weapons or research facilities). It is noted that not all waters (e.g. processing or wastewaters) have a major ion chemistry suitable for the formation of LDH or specific types of LDH such as Mg—Al HT or similar compositions. Thus, it may be necessary to tailor this chemistry for the formation of LDH or more specifically Mg—Al HT. The tailoring of the solution chemistry includes the step of adding the silicate material in a manner as set out in step (a) and may also addition of one or more reagents such as those containing Mg and/or Al to achieve a suitable Mg:Al ratio for promoting formation of the LDH in situ.

In some embodiments, at least one of the dissolved anions in the water from a stream such as process stream may comprise a complex anion such that at least one of the complex anions is intercalated into an interlayer of the LDH formed in situ and wherein one or more dissolved cations are incorporated into the LDH material's crystal structure or matrix. Preferably, the process may further comprise the steps of controlling pH levels in the water thereby controlling speciation of the complex anion.

It will be appreciated that the LDH formed in situ or added to the stream or derivatives of these LDH may also provide a substrate for a range of chemisorption or physisorption reactions that may also be used to recover one or more commodities or contaminants.

Any of the features described herein can be combined in any combination with any one or more of the other features described herein are within the scope of the disclosure.

DETAILED DESCRIPTION

Figure 1:
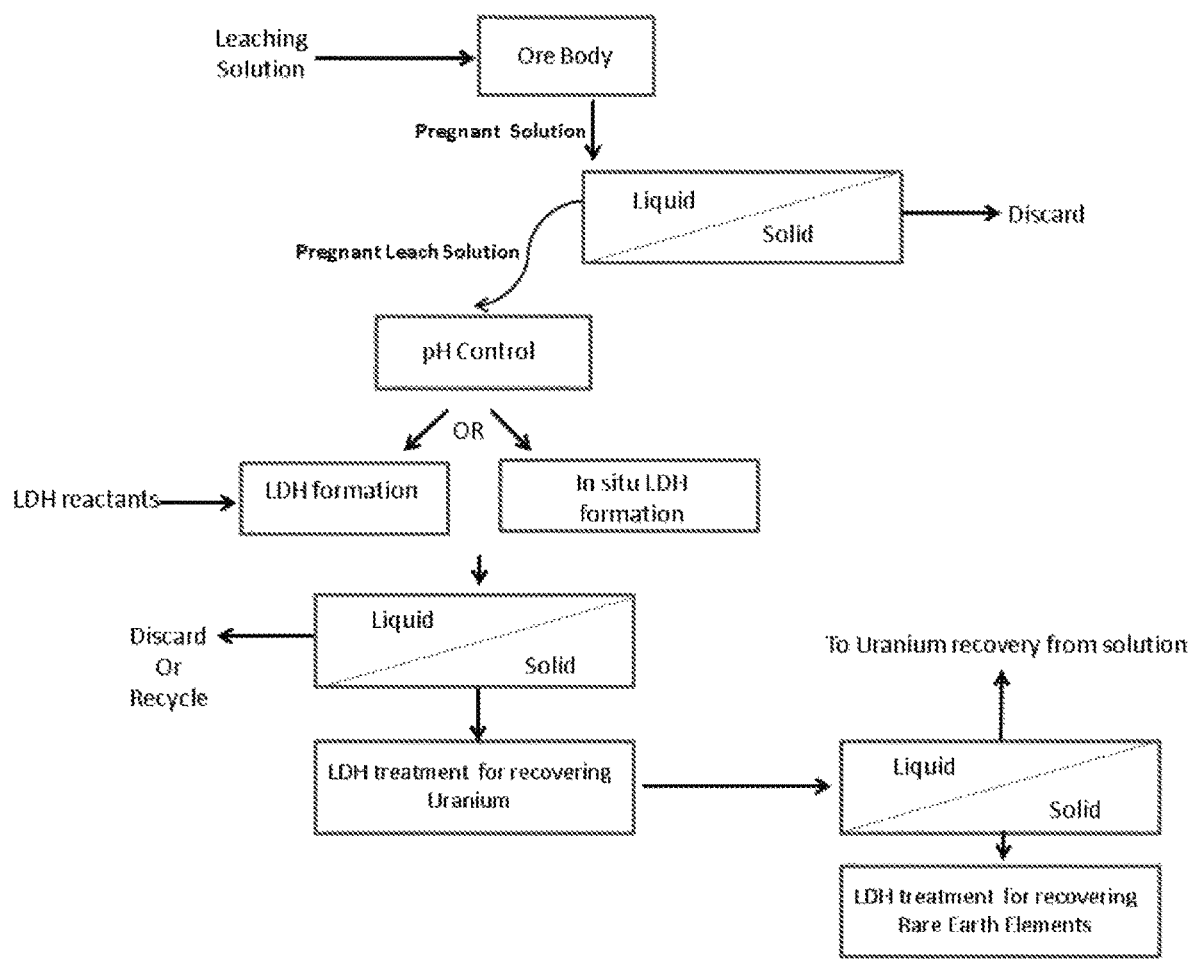
FIG. 1 is schematic flowchart of a process for separating one or more metallic commodities in an aqueous solution by adopting a process in accordance with a preferred embodiment.
Figure 2:
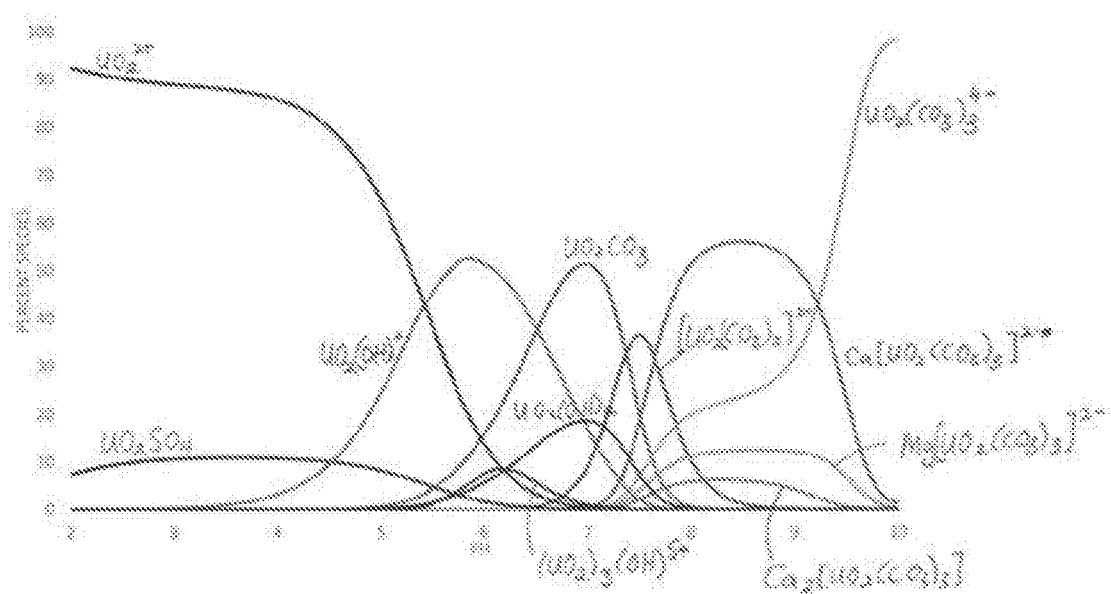
FIG. 2 represents a speciation diagram for the system U—$H_2O$—$SO_4$—$CO_3$ from pH 2-10 in equilibrium with the atmosphere.

Referring to the flow diagram illustrated in FIG. 1, an ore body containing a plurality of metallic constituents such as uranium and REE may be introduced to an aqueous leaching solution to obtain a pregnant leaching solution or aqueous stream. Some of the metallic constituents such as uranium may form complex anions in the solution, such as uranyl anionic complexes, as described in previous sections. Some of the other metallic constituents particularly constituents such as the REE may typically form cations in the aqueous solutions. The liquid phase of the pregnant leach solution containing the dissolved anions and cations may be separated from the undissolved solids and directed to a reaction step. The reaction step may comprise steps such as controlling the pH to determine the speciation of the uranyl complexes as illustrated in FIG. 2. The reaction step may form complex anions containing the metallic constituent (e.g. uranium). The reaction step may be followed by an LDH formation step or alternatively an LDH addition step or LDH addition and cycling of the pH to induce partial dissolution and then reformation of the LDH.

In the LDH formation step, additives such as divalent additives such as MgO may be added in combination with trivalent additives such as soluble alumina salts in specific ratios and under suitable pH (alkaline pH) to promote the in-situ formation of LDH material in the solution. Such an LDH formation step also results in intercalation of the complex anion (such as the uranyl complex anion) interlayers of the LDH material formed in-situ. The metallic cations are also incorporated into the metal oxide layers of the LDH material formed in situ thereby forming a part of the crystal structure or matrix of the LDH. Such separation of the metallic species is based upon the differing uptake mechanisms for different ions provided by the LDH material formed in situ.

As described earlier, the LDH formation step may be substituted or complemented by an LDH addition step in which pre-formed LDH material may be added to the solution containing the complex anions (uranyl complex anion) and the metallic cations. The step of adding pre-formed LDH material also results in intercalation of the complex anion (such as the uranyl complex anion) interlayers of the LDH material. This step may also include controlling pH so that part of the LDH may be initially dissolved at a pH of less than 9 and as low as pH 1, for specified time intervals as required to yield a sufficient degree of LDH dissolution, followed by an increase in the pH to promote reformation of the LDH material in situ. During this reformation step, other cations such as REE cations may be incorporated into the metal hydroxide layer substituting for the original cations in the initially added LDH. During this process, some anions, in particular those comprised of uranyl anionic complexes may also be substituted into the interlayer of the LDH material. Note that other techniques may also be used in the dissolution or reformation steps including (ultra) sonication or the addition of other solvents or reagents as required.

The LDH material containing the intercalated complex anion and obtained from the LDH formation step or the LDH addition step may be separated by processes such as sedimentation, flocculation, filtration, cyclonic separation or other known separation methods. The separated LDH material may then be subjected to a further process for recovering the intercalated complex anion (e.g. the uranyl complex anion) such as an ion exchange process in accordance with the steps described in the preceding sections of the specification. Alternative methods of recovering the intercalated metallic constituent may also be employed in accordance with the process step detailed in the preceding sections. As discussed earlier, the recovery treatment step may not be limited to recovery of the intercalated metallic constituent such as the uranyl complex anion but may further include recovery of the metallic cations such as REE incorporated in the LDH matrix in the LDH formation step.

The process described herein utilises the differing uptake mechanisms for different metallic ionic species as a way of separating the metallic species. In some embodiments, desirable separation and recovery is achieved by intercalating at least one metallic constituent in the interlayer (such as the uranyl complex anion) of the LDH (formed in-situ or added to the solution) and subsequently recovering the metallic constituent from the LDH by a further recovery step.

EXAMPLES

Example 1

In a first exemplary embodiment (example 1) the process may be utilised for the processing of uranium-bearing ores. It is common in uranium bearing ores that a range of other elements are present in addition to uranium. The other elements may include elements such as As, Se, Cu and the rare earth elements (REE— $Ln^{3+}$ comprising La—Lu+Sc+Y). The inventor has found that REE predominantly exist as $Ln^{3+}$ cations in a +3 oxidation state. Cerium exists in +3 and +4 oxidation states. Europium exists in +2 and +3 oxidation states. In the exemplary process, a uranium bearing solution derived from leaching of a uranium ore was contacted with LDH material.

There are two different ways in which intercalation of the uranyl complex anion may be achieved. In a first possible way, the uranyl complex anion would readily intercalate into the interlayer of the LDH material added to the solution. However, utilising such a method does not result in uptake of the REE into the matrix or crystal structure of the LDH material added to the uranium.

In a more preferred way, the LDH material added to the uranium bearing solution was dissolved in the uranium bearing solution by reducing the pH of the solution to less than 3. Reducing the pH level resulted in dissolution of the LDH material thereby resulting in the release of divalent and trivalent cations (that form the metal oxide layers of the LDH material) into the solution. After dissolving the LDH material, the pH was increased to provide alkaline reaction conditions in the solution. Providing such alkaline conditions resulted in reformation of the LDH material as a result of precipitation of the LDH material in the solution. During the reformation of the LDH material the divalent and trivalent cations that were dissolved into the solution (as a result of the initial dissolving step) precipitated to form the metal oxide layer of the reformed LDH material. During the reformation step at least some of the REE cations were also incorporated into the crystal structure of the reformed LDH material. Anionic uranyl complexes were also intercalated into the interlayer of the reformed LDH material. Importantly it has been recognised that as the divalent to trivalent ratio of metals in the primary metal hydroxide layer of the LDH may typically vary between 2:1 and 4:1, changes in this ratio may occur in the reformed LDH due to incorporation of other cations from solution that still allow a stable LDH to form.

During the course of the process, the REE were shown to be strongly partitioned into the primary metal hydroxide layer of the reformed LDH material substituting for other +3 cations such as Al and Fe that were present in the initially added LDH material. Unlike the REE cations, the uranyl ion (uranium is known to exist as a $UO_2^{2+}$ oxy-cation in solution) is considered too large to substitute for the +2 cations such as $Mg^{2+}$ Alkaline earth and transition metals generally present in the metal hydroxide layers of LDH material. As shown in FIG. 2, under low pH conditions, anionic uranyl complexes are formed especially $UO_2^{2+}$–$SO_4$ complexes (e.g. $UO_2(SO_4)_3^{4-}$). Under intermediate to higher pH $UO_2^{2+}$–$CO_3^{2-}$ anionic complexes (e.g. $UO_2(CO_3)_2^{2-}$, $UO_2(CO_3)_3^{4-}$, $CaUO_2(CO_3)_3^{2-}$) may predominate. Given this speciation of the $UO_2^{2+}$ as anionic complexes, these uranyl anionic complexes preferentially partition into the anionic interlayers of LDH. As a result, the process of example 1 provides the following advantages:

- Valuable REE are contained within the metal hydroxide layers of the LDH
- Valuable U is contained as anionic complexes within the LDH interlayers. Separation of these two valuable commodities U and REE, not only from each other in terms of the way they are bound in the initial solution, but also from other components including some contaminants, salts or ions etc. that may otherwise interfere in the U or REE recovery process is highly beneficial for later separation, recovery and purification.
- A solid LDH is produced that typically may contain in excess of 30% U and 0-50% REE, typically 100-300 times typical ore grades of these elements thus allowing substantial enrichment of the commodities of value.
- Effective separation of potentially problematic ions such as $Na^+$, $Cl^-$ and $SO_4^{2-}$ or other additives from the mineral processing stream (with the potential to make for simpler processing, further enrichment or recovery).
- Production of a cleaner effluent that may potentially be reused in mineral processing or other site or other operations without (or minimal) additional treatment.

In addition to the above, given the different partitioning or separation of U from REE, several methods may be utilised for recovering a commodity of interest based upon the separation of commodities achieved, as elucidated above. Recovery of one or more commodities may be carried out effectively by one or more of the following further steps:

- the addition of a strong alkali to displace $UO_2^{2+}$–$SO_4$ complexes by $OH^-$ anions, or reducing the pH such that less charged or neutral $UO_2$ complexes are displaced from the LDH interlayers.
- other complexing ligands or other anions (e.g. NTA, EDTA) may be added to the LDH to displace the $UO_2$-complexes and form new NTA, EDTA complexes.
- addition of other chemical reagents such as phosphates, vanadates or inorganic or organic peroxides, or combinations thereof, to induce uranium precipitation.
- partial or complete dissolution of a U-, REE-metal-containing LDH by the addition of acid and recovery of the constituents by conventional means.
- addition of reducing agents, anoxia or gases (e.g. CO) to reduce uranyl complexes (U +6 oxidation state) to U (+4 oxidation state) for example as $UO_2$ to eliminate the uranyl complexation with carbonate on the basis of charge and allow recovery of U in the +4 oxidation state. Such recovery methods may include physical (e.g. ultrasonication) or otherwise chemical (solvent-based) delamination of the LDH to recover the reduced U or the application of other physicochemical methods as required.
- other methods of separation that may include calcination such that with heating, typically in the range 100-1200° C., there will be layer collapse and re-crystallisation of the LDH leading to the formation of discrete or intimately associated mineral phases such as spinel and periclase. These phases, by virtue of their chemistry and crystal structure, may accommodate one of more elements of interest or may provide enhanced opportunities for recovery of particular elements given the different physicochemical properties of the mineral phases formed from calcination.

The methods of stabilisation described here may also find applications in the nuclear energy or weapons industries to assist in the containment of Uranium bearing materials or wastes including transuranics or daughter radionuclides.

Example 2

In a second exemplary embodiment (example 2) the process may be utilised for the processing of uranium-bearing ores, in which LDH can be formed in situ within a mineral processing or metallurgical stream that includes the uranium bearing ores. The uranium ore containing stream was dosed, typically with one of or both of Mg and Al containing compounds, to achieve a desired ratio of Mg/Al in the stream which results in precipitation of LDH such as hydrotalcites. As explained in example 1, uranium bearing ores include a range of other elements that are present in addition to uranium which includes heavy metals, metalloids and/or REE. Forming the LDH material in situ also results in incorporation of the cations such as $Ln^{3+}$ cations and/or $Ce^{3+}$ and $Ce^{4+}$ and/or $Eu^{2+}$ or $Eu^{3+}$ oxidation states. In situ formation of the LDH also results in REE cations being shown to be strongly partitioned into the primary metal hydroxide layer of LDH. As discussed earlier, since uranium exists as an oxy-cation commonly known as a uranyl ($UO_2^{2+}$) cation, the uranyl ion is too large to be substituted for +2 cations such as $Mg^{2+}$ into the LDH. Alkaline earth and transition metals generally present in the metal hydroxide layers of the LDH. Once again, under low pH conditions, anionic uranyl complexes are formed, especially $UO_2^{2+}$–$SO_4$ complexes (e.g. $UO_2(SO_4)_3^{4-}$). Under intermediate to higher pH $UO_2^{2+}$–$CO_3^{2-}$ anionic complexes (e.g. $UO_2(CO_3)_2^{2-}$, $UO_2(CO_3)_3^{4-}$, $CaUO_2(CO_3)_3^{2-}$) may predominate. Given this speciation of the $UO_2^{2+}$ as anionic complexes, these uranyl anionic complexes preferentially partition into the anionic interlayers of LDH formed in situ. The process described in example 2 also provides one or more of the several advantages of the process of Example 1 as summarised above. The commodities of interest may also be recovered by one or more of the further recovery steps listed under Example 1.

Example 3

In a third exemplary embodiment (Example 3) the process may be utilised for the processing of uranium-bearing ores, in which LDH can be formed in situ within an alkaline mineral processing or metallurgical stream that includes the uranium bearing ores.

The uranium ore containing stream was dosed, typically with one of both of Mg and Al containing compounds, to achieve a desired ratio of Mg/Al in the stream which results in precipitation of LDH such as hydrotalcites. Due to the pre-existing alkaline conditions (pH of at least greater than 7 and preferably greater than 8) of the alkaline mineral processing or metallurgical stream, in situ formation of LDH is favourable when the desired ratio of Mg/Al is achieved. As explained in Example 1, uranium bearing ores include a range of other elements that are present in addition to uranium which includes heavy metals, metalloids and/or REE. Forming the LDH material in situ also results in incorporation of the cations such as $Ln^{3+}$ cations and/or $Ce^{3+}$ and $Ce^{4+}$ and/or $Eu^{2+}$ or $Eu^{3+}$ oxidation states and a range of anions including oxo-metallic anions or oxyanions. Laboratory trials have demonstrated that the Al containing compound is preferably to be added first or in conjunction with any Mg containing compound to prevent the precipitation of the Mg as Mg carbonate compounds such as $MgCO_3$ rather than it being utilised in the formation of the LDH In situ formation of the LDH also results in REE cations being shown to be strongly partitioned into the primary metal hydroxide layer of LDH. As discussed earlier, since uranium exists as an oxy-cation commonly known as a uranyl ($UO_2^{2+}$) cation, the uranyl ion is too large to be substituted for +2 cations such as $Mg^{2+}$ into the LDH. Alkaline earth and transition metals generally present in the metal hydroxide layers of the LDH. Once again, under the alkaline conditions of the stream, anionic uranyl complexes are formed. Under the intermediate to higher pH conditions of the stream, $UO_2^{2+}$-$CO_3^{2-}$ anionic complexes (e.g. $UO_2(CO_3)_2^{2-}$, $UO_2(CO_3)_3^{4-}$, $CaUO_2(CO_3)_3^{2-}$) may predominate. Given this selective speciation of the $UO_2^{2+}$ as anionic complexes, these uranyl anionic complexes preferentially partition into the anionic interlayers of LDH formed in situ.

It is important to appreciate that under the reaction conditions of example 3, as explained above only carbonate complexes will predominate and some REE, particularly the mid (MREE) to heavy REE (HREE) may be preferentially retained in the solution due to the known preferential complexation of MREE and HREE by carbonate ligands. This preferential speciation under alkaline conditions may be used advantageously given that the MREE and HREE are generally considered the most valuable components of the REE due to their often low abundance.

In another exemplary embodiment, the step of contacting the solution with one or more additives to form layered double hydroxide (LDH) material was carried out by adding a magnesium and aluminium containing silicate material in the aqueous solution and dissolving at least a part of the silicate material in the solution thereby leaching at least a part of the magnesium and/or aluminium from the silicate material into the water; and controlling reaction conditions for achieving an appropriate Mg:Al ratio in the solution for formation of the layered double hydroxide (LDH) in situ.

Raw materials, primarily Mg—Al or Al-bearing aluminosilicate clays (vermiculite, attapulgite, sepiolite, talc kaolinite) and zeolites (white and pink clinoptilolite), were procured from industrial and commercial sources. These clays and zeolites were used as sources of raw materials, principally Al and Mg, during acid and alkali dissolution experiments enhanced by the use of ultrasonication.

Initial batch decomposition reactions of the aluminosilicates in both acid and alkali and with the additional use of agitation including ultrasonication were completed. Results of ICP analyses to quantify the extent of dissolution due to acid or alkali in combination with stirring (1-4 hours) or ultrasonication+stirring (1 hour) are presented in Table 1 and FIG. 3. These results indicate that substantial Mg and Al release (preferably >3:1 Mg/Al molar ratio) as required for hydrotalcite synthesis can be achieved from clays or zeolites during acid extraction. In addition, some clays such as sepiolite (Table 1) yielded both high concentrations of Mg and Al and high Mg/Al molar ratios. Under acidic conditions, all clays and zeolites demonstrated incongruent dissolution with Mg/Al and Al/Si ratios higher in the solute than the solid. In contrast, under alkali conditions any incongruent dissolution was obscured by secondary precipitation reactions.

TABLE 1

Geochemistry of filtered solutions produced by 1M HCl or 1M NaOH digestion after stirring (1-4 hours) and ultrasonication + stirring (1 hour) of clay and zeolite suspensions.

| Clay/zeolite | Al | Si | Mg | Ca | Fe | K | Na | Mg mM | Al mM | Si mM | Mg/Al | Al/Si |
|---|---|---|---|---|---|---|---|---|---|---|---|---|
| Attapulgite sonicated 1 hr in 1M HCl | 88 | 172 | 183 | 206 | 52 | 61 | 143 | 8 | 3 | 6 | 2.3 | 0.5 |
| Attapulgite sonicated 1 hr in 1M NaOH | 31 | 176 | 0 | 3 | 0 | 34 | 24202 | 0 | 1 | 6 | 0.0 | 0.2 |
| Attapulgite stirred 1 hr in 1M HCl | 27 | 25 | 113 | 172 | 10 | 28 | 384 | 5 | 1 | 1 | 4.6 | 1.1 |
| Attapulgite stirred 1 hr in 1M NaOH | 7 | 70 | 0 | 6 | 0 | 31 | 22591 | 0 | 0 | 3 | 0.0 | 0.1 |
| Attapulgite stirred 2 hr in 1M HCl | 29 | 34 | 117 | 173 | 12 | 28 | 82 | 5 | 1 | 1 | 4.5 | 0.9 |
| Attapulgite stirred 2 hr in 1M NaOH | 8 | 81 | 0 | 6 | 0 | 32 | 22620 | 0 | 0 | 3 | 0.0 | 0.1 |
| Attapulgite stirred 4 hr in 1M HCl | 38 | 63 | 125 | 170 | 17 | 31 | 90 | 5 | 1 | 2 | 3.6 | 0.6 |
| Attapulgite stirred 4 hr in 1M NaOH | 10 | 103 | 0 | 5 | 0 | 32 | 21519 | 0 | 0 | 4 | 0.0 | 0.1 |
| Clinoptilolite (pink) sonicated 1 hr in 1M HCl | 192 | 74 | 35 | 139 | 32 | 17 | 114 | 1 | 7 | 3 | 0.2 | 2.7 |
| Clinoptilolite (pink) sonicated 1 hr in 1M NaOH | 54 | 158 | 0 | 2 | 1 | 13 | 25419 | 0 | 2 | 6 | 0.0 | 0.4 |
| Clinoptilolite (pink) stirred 1 hr in 1M HCl | 85 | 16 | 18 | 90 | 11 | 9 | 49 | 1 | 3 | 1 | 0.2 | 5.4 |
| Clinoptilolite (pink) stirred 1 hr in 1M NaOH | 10 | 32 | 0 | 19 | 0 | 7 | 23071 | 0 | 0 | 1 | 0.0 | 0.3 |
| Clinoptilolite (pink) stirred 2 hr in 1M HCl | 85 | 18 | 17 | 89 | 11 | 8 | 51 | 1 | 3 | 1 | 0.2 | 4.9 |

TABLE 1-continued

Geochemistry of filtered solutions produced by 1M HCl or 1M NaOH digestion after stirring (1-4 hours) and ultrasonication + stirring (1 hour) of clay and zeolite suspensions.

| Clay/zeolite | Al | Si | Mg | Ca | Fe | K | Na | Mg mM | Al mM | Si mM | Mg/Al | Al/Si |
|---|---|---|---|---|---|---|---|---|---|---|---|---|
| Clinoptilolite (pink) stirred 2 hr in 1M NaOH | 10 | 35 | 0 | 17 | 0 | 17 | 23211 | 0 | 0 | 1 | 0.0 | 0.3 |
| Clinoptilolite (pink) stirred 4 hr in 1M HCl | 107 | 28 | 21 | 99 | 14 | 9 | 63 | 1 | 4 | 1 | 0.2 | 4.0 |
| Clinoptilolite (pink) stirred 4 hr in 1M NaOH | 13 | 41 | 0 | 11 | 0 | 10 | 22719 | 0 | 0 | 1 | 0.0 | 0.3 |
| Clinoptilolite (white) sonicated 1 hr in 1M HCl | 347 | 67 | 45 | 146 | 13 | 198 | 76 | 2 | 13 | 2 | 0.1 | 5.4 |
| Clinoptilolite (white) sonicated 1 hr in 1M NaOH | 160 | 777 | 0 | 1 | 0 | 160 | 24486 | 0 | 6 | 28 | 0.0 | 0.2 |
| Clinoptilolite (white) stirred 1 hr in 1M HCl | 151 | 18 | 21 | 75 | 4 | 157 | 49 | 1 | 6 | 1 | 0.2 | 9.0 |
| Clinoptilolite (white) stirred 1 hr in 1M NaOH | 13 | 98 | 0 | 3 | 0 | 120 | 22080 | 0 | 0 | 3 | 0.0 | 0.1 |
| Clinoptilolite (white) stirred 2 hr in 1M HCl | 152 | 20 | 22 | 78 | 4 | 162 | 49 | 1 | 6 | 1 | 0.2 | 7.9 |
| Clinoptilolite (white) stirred 2 hr in 1M NaOH | 22 | 130 | 0 | 2 | 0 | 119 | 22496 | 0 | 1 | 5 | 0.0 | 0.2 |
| Clinoptilolite (white) stirred 4 hr in 1M HCl | 178 | 28 | 24 | 85 | 5 | 163 | 49 | 1 | 7 | 1 | 0.2 | 6.5 |
| Clinoptilolite (white) stirred 4 hr in 1M NaOH | 31 | 182 | 0 | 2 | 0 | 120 | 23054 | 0 | 1 | 6 | 0.0 | 0.2 |
| Sepiolite sonicated 1 hr in 1M HCl | 18 | 75 | 326 | 22 | 6 | 7 | 5 | 13 | 1 | 3 | 19.8 | 0.3 |
| Sepiolite stirred 1 h in 1M HCl | 20 | 105 | 357 | 22 | 7 | 10 | 5 | 15 | 1 | 4 | 19.9 | 0.2 |
| Sepiolite stirred 2 h in 1M HCl | 23 | 125 | 374 | 22 | 16 | 13 | 4 | 15 | 1 | 4 | 18.4 | 0.2 |
| Sepiolite stirred 4 h in 1M HCl | 76 | 406 | 1312 | 26 | 50 | 19 | 8 | 54 | 3 | 14 | 19.1 | 0.2 |
| Talc sonicated 1 hr in 1M HCl | 10 | 53 | 71 | 11 | 4 | 6 | 57 | 3 | 0 | 2 | 8.1 | 0.2 |
| Talc stirred 1 h in 1M HCl | 1 | 5 | 16 | 9 | 1 | 3 | 7 | 1 | 0 | 0 | 17.3 | 0.2 |
| Talc stirred 2 h in 1M HCl | 1 | 8 | 18 | 9 | 1 | 3 | 6 | 1 | 0 | 0 | 16.9 | 0.2 |
| Talc stirred 4 h in 1M HCl | 4 | 30 | 40 | 9 | 2 | 2 | 7 | 2 | 0 | 1 | 11.4 | 0.1 |
| Vermiculite sonicated 1 hr in 1M HCl | 538 | 784 | 1605 | 19 | 570 | 532 | 28 | 66 | 20 | 28 | 3.3 | 0.7 |
| Vermiculite sonicated 1 hr in 1M NaOH | 2 | 15 | 0 | 1 | 1 | 59 | 25733 | 0 | 0 | 1 | 0.1 | 0.1 |
| Vermiculite stirred 1 hr in 1M HCl | 28 | 13 | 71 | 47 | 30 | 139 | 7 | 3 | 1 | 0 | 2.9 | 2.1 |
| Vermiculite stirred 1 hr in 1M NaOH | 1 | 3 | 1 | 3 | 1 | 37 | 22442 | 0 | 0 | 0 | 1.3 | 0.3 |
| Vermiculite stirred 2 hr in 1M HCl | 84 | 85 | 234 | 48 | 90 | 170 | 10 | 10 | 3 | 3 | 3.1 | 1.0 |
| Vermiculite stirred 2 hr in 1M NaOH | 1 | 3 | 0 | 3 | 0 | 46 | 22636 | 0 | 0 | 0 | 0.1 | 0.2 |
| Vermiculite stirred 4 hr in 1M HCl | 127 | 169 | 359 | 49 | 136 | 193 | 6 | 15 | 5 | 6 | 3.1 | 0.8 |
| Vermiculite stirred 4 hr in 1M NaOH | 0 | 4 | 0 | 4 | 0 | 55 | 22335 | 0 | 0 | 0 | 1.1 | 0.1 |

Figure 3:
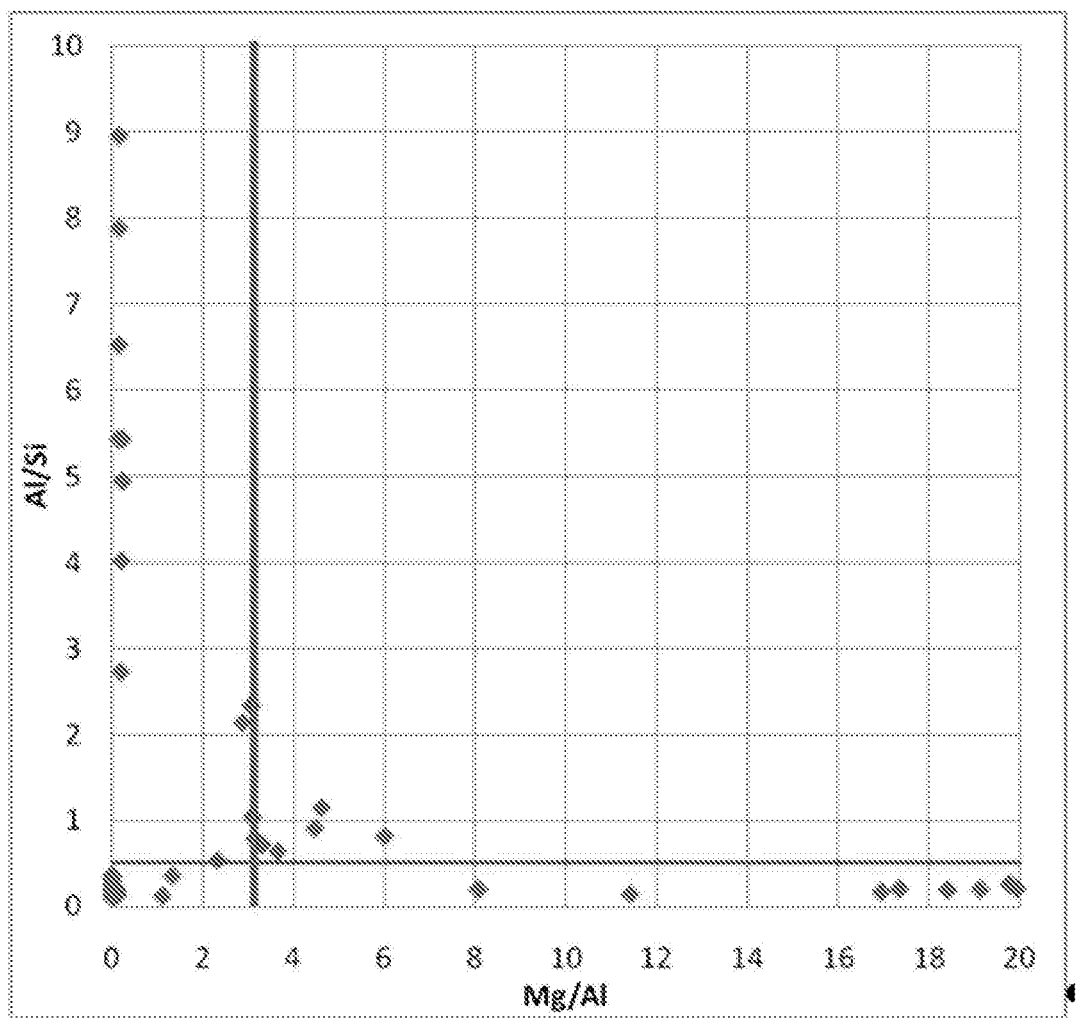
FIG. 3 depicts Molar ratios of Al/Si and Mg/Al produced by 1 M HCl and 1 M NaOH after stirring (1-4 hours) and ultrasonication+stirring (1 hour) of filtered clay and zeolite solutions in accordance with an embodiment of the present disclosure. Crossed lines mark Al/Si molar ratio of 0.5 and Mg/Al molar ratio of 3 (see text).

Importantly, the dissolution of Mg and Al is substantially enhanced using the combination of ultrasonication+stirring relative to stirring alone. During an acid digest, substantial Si and other elements such as Fe and Ca may also be released depending on the chemistry and purity of the clay or zeolite. This is undesirable as excess silica can potentially occupy the interlayer anion exchange site within the LDH or HT during formation or may combine with Al to form other compounds during LDH or HT synthesis. In particular, it is desirable that the Al/Sl molar ratio is <0.5 as depicted in FIG. 3. In addition, abundant Fe may result in substitution for one or both of Mg and Al in the LDH or HT structure. If Fe is present in sufficient quantities this may lead to the formation of unstable green rusts.

Alkali dissolution using either stirring or ultrasonication+ stirring, as expected, yielded a substantially different solution composition with enhanced dissolution of Si over that of Al, while Mg was low as it is likely to have precipitated as brucite —$Mg(OH)_2$. Whilst excess silica is generally undesirable in the formation of LDH or HT as described above, potential exists to use the remnant clay or zeolite after dissolution as substrates for LDH or HT nucleation.

In cases where high Si is present, this may occupy at least part of the anionic interlayers of the LDH or HT structure. This property may be exploited if calcination is required to form other high temperature phases as described elsewhere.

Further clay dissolution experiments were undertaken with H2SO4 in place of HCl to investigate the effects, if any, of using a different acid. These results are presented in Table 2 and illustrate that relatively less dissolved Si is produced in the presence of H2SO4 yielding lower Al/Si ratios. As outlined above, this is considered important in the synthesis of LDH or HT from solutions produced by clay or zeolite dissolution. In addition, Mg/Al ratios generally increased using $H_2SO_4$ in place of HCl.

TABLE 2

Ratios of concentrations of Al, Si and Mg and Mg/Al and Al/Si in solutions produced by 1M $H_2SO_4$ and 1M HCl digestion using ultrasonication + stirring (1 hour) of clay and zeolite suspensions.

| Clay/zeolite | Al ($H_2SO_4$/HCl) | Si ($H_2SO_4$/HCl) | Mg ($H_2SO_4$/HCl) | Mg/Al ($H_2SO_4$/HCl) | Al/Si ($H_2SO_4$/HCl) |
|---|---|---|---|---|---|
| Vermiculite sonicated 1 hr in 1M HCl or $H_2SO_4$ | 0.7 | 0.5 | 0.7 | 1.0 | 1.4 |
| Sepiolite sonicated 1 hr in 1M HCl or $H_2SO_4$ | 2.7 | 0.7 | 3.1 | 1.2 | 3.8 |
| Attapulgite sonicated 1 hr in 1M HCl or $H_2SO_4$ | 0.6 | 0.6 | 0.8 | 1.3 | 1.0 |
| Kaolinite sonicated 1 hr in 1M HCl or $H_2SO_4$ | 1.5 | 1.4 | 5.0 | 3.3 | 1.1 |
| Pink clinopt sonicated 1 hr in 1M HCl or $H_2SO_4$ | 0.4 | 0.2 | 0.4 | 1.1 | 1.9 |
| White clinop sonicated 1 hr in 1M HCl or $H_2SO_4$ | 0.7 | 0.6 | 0.7 | 1.0 | 1.1 |

On the basis of the above dissolution experiments and supplementary experiments using $H_2SO_4$ in place of HCl, synthesis of the nano-hybrid materials was undertaken using a range of clay and zeolite. In addition, aluminate was also used as both a source of additional Al and as a neutralising agent. A list of the nano-hybrid material produced and their P-uptake capacity is given in Table 3.

TABLE 3

Phosphorus uptake capacity of a range of clay/zeolite nano-hybrid materials synthesised in this study.

| Clay/zeolite | P-uptake mg/g |
|---|---|
| Unground vermiculite + white clinoptilolite ALL SOLIDS | 4.6 |
| Unground Vermiculite + aluminate ALL SOLIDS | 5.4 |
| Sepiolite + aluminate ALL SOLIDS | 9.0 |
| Unground vermiculite/white clinoptilolite NO SOLIDS | 11.7 |
| Sepiolite/white clinoptilolite ALL SOLIDS | 13.2 |
| Sepiolite + white clinoptilolite ALL SOLIDS | 13.5 |
| Vermiculite + white clinoptilolite ALL SOLIDS | 13.7 |
| Vermiculite + aluminate ALL SOLIDS | 14.1 |
| Unground vermiculite/white clinoptilolite ALL SOLIDS | 14.3 |
| Vermiculite/white clinoptilolite ALL SOLIDS | 14.5 |
| Unground vermiculite + aluminate NO SOLIDS | 15.4 |
| Vermiculite/white clinoptilolite NO SOLIDS | 17.5 |
| Vermiculite + aluminate NO SOLIDS | 19.8 |
| Sepiolite/white clinoptilolite NO SOLIDS | 28.4 |
| Sepiolite + aluminate NO SOLIDS | 41.7 |

Mixing ratios of solutions both with and without residual clay or zeolite solids present were determined using the equation:

$$v_1/v_2 = (r[Mg]_2 - [Al]_2)/([Al]_1 - r[Mg]_1)$$

where $v_1$ and $v_2$ are the volume ratio of the two clay or zeolite solutions required to give r which is the required Mg:Al ratio in the final solution (in this case 3), and $[Mg]_1$, $[Mg]_2$ and $[Al]_1$ and $[Al]_2$ are the concentrations of Mg and Al in solutions 1 and 2, respectively. Where aluminate was added, target Mg/Al molar ratios of 3 were calculated.

Figure 4:
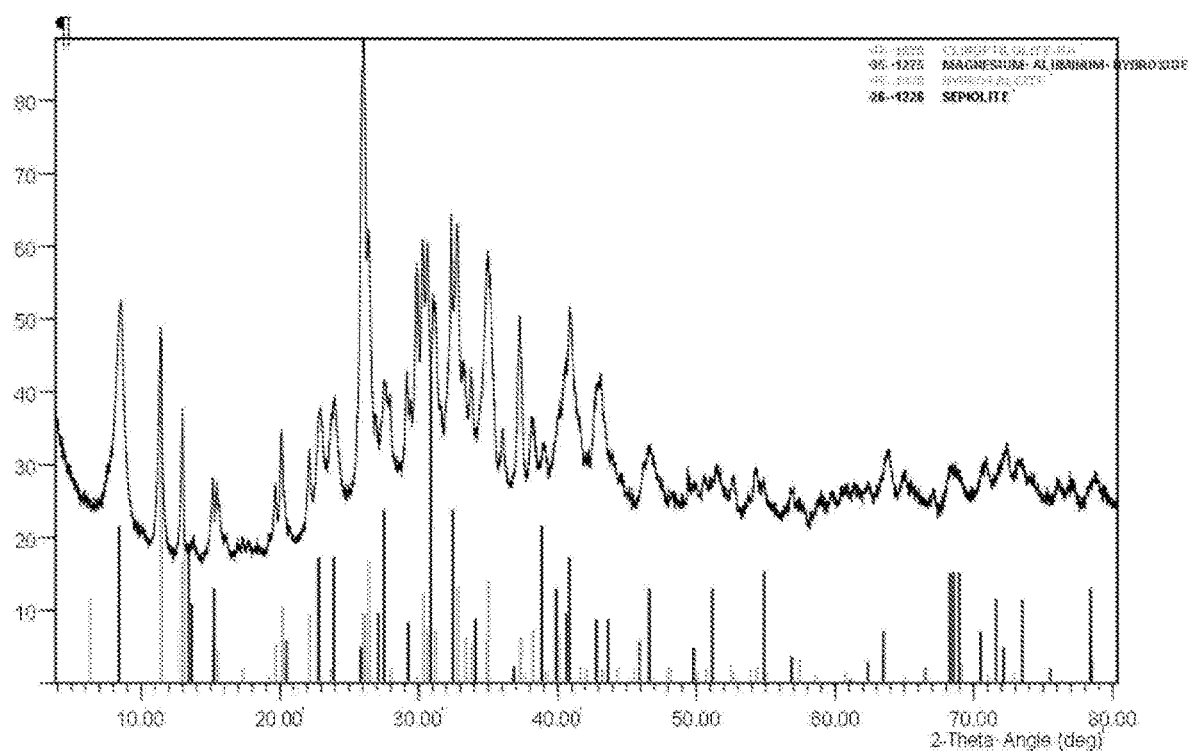
FIG. 4 depicts X-ray diffraction (XRD) spectrum of sepiolite/white clinoptilolite-hydrotalcite nanohybrid. Note peaks corresponding to sepiolite and clinoptilolite precursors and characteristic hydrotalcite (pale blue)/Mg—Al hydroxide (pink) peaks at ~13 and 26 degrees, 2 Theta.

Mineralogical (XRD) analysis of the nano-hybrid materials indicated the presence of hydrotalcite in addition to the residual clay or zeolite mineral which acted as a scaffold for hydrotalcite nucleation and precipitation is depicted in FIG. 4.

Figure 5:
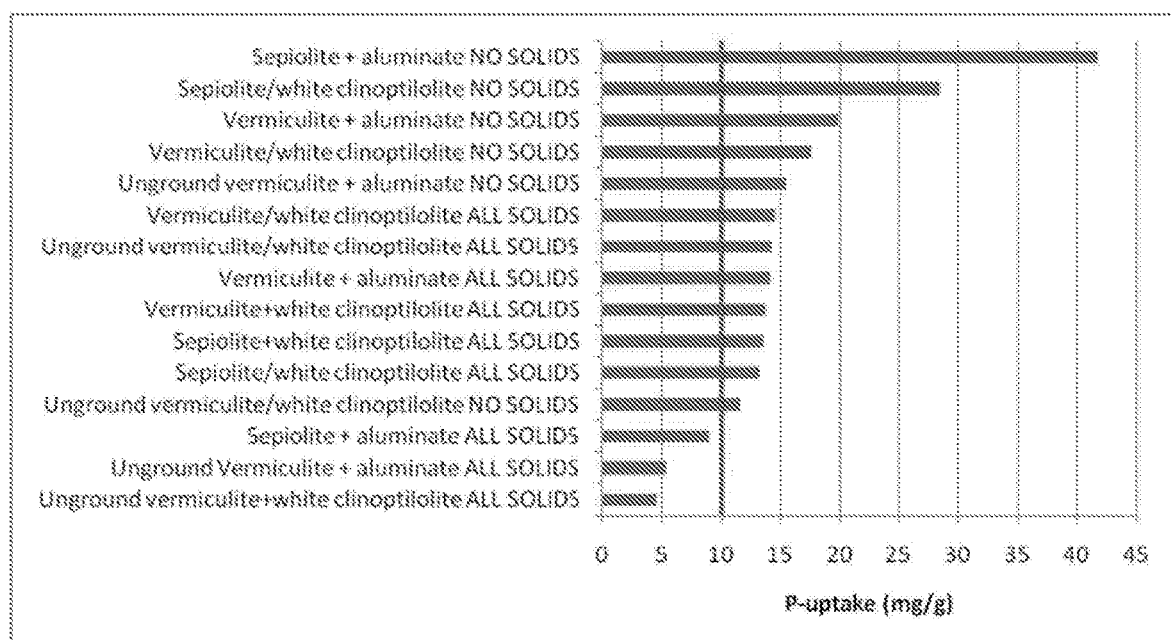
FIG. 5 depicts phosphorus uptake capacity of a range of clay/zeolite nano-hybrid materials synthesised in this study.

The significance of the examples presented here is that a new class of material has been synthesised using a novel preparation method utilising elements contained within commercial clays to produce nano-hybrids which contain LDH in the form of HT grafted onto the original clay or zeolite substrate. The beneficiation process adds significant utility and value to commercially-mined clays and zeolites as demonstrated by the high P-uptake (as phosphate) achieved as depicted in FIG. 5. The high P-uptake demonstrates that other simple or complex anions, for instance uranyl-carbonate complexes, may also be removed from solution using these materials.

Example 4

Figure 6:
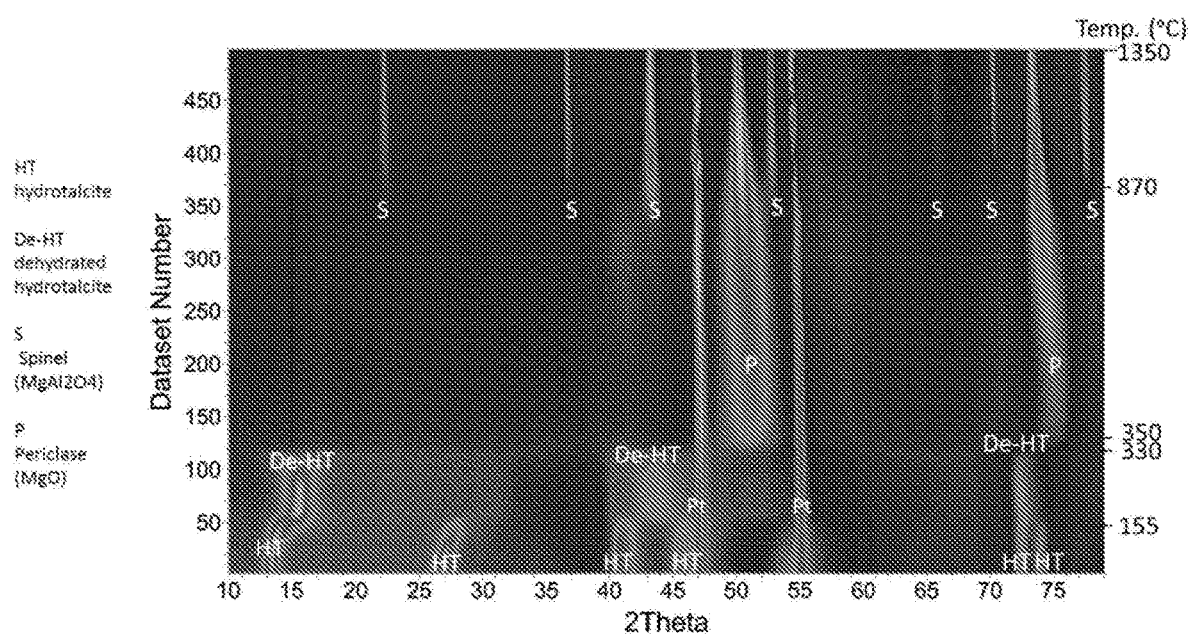
FIG. 6 depicts an integrated, grey-scale diffractogram of approximately 500 X-ray diffraction (XRD) traces collected during calcination of a hydrotalcite sample heated up to 1350° C. using a Pt strip heater.
Figure 7:
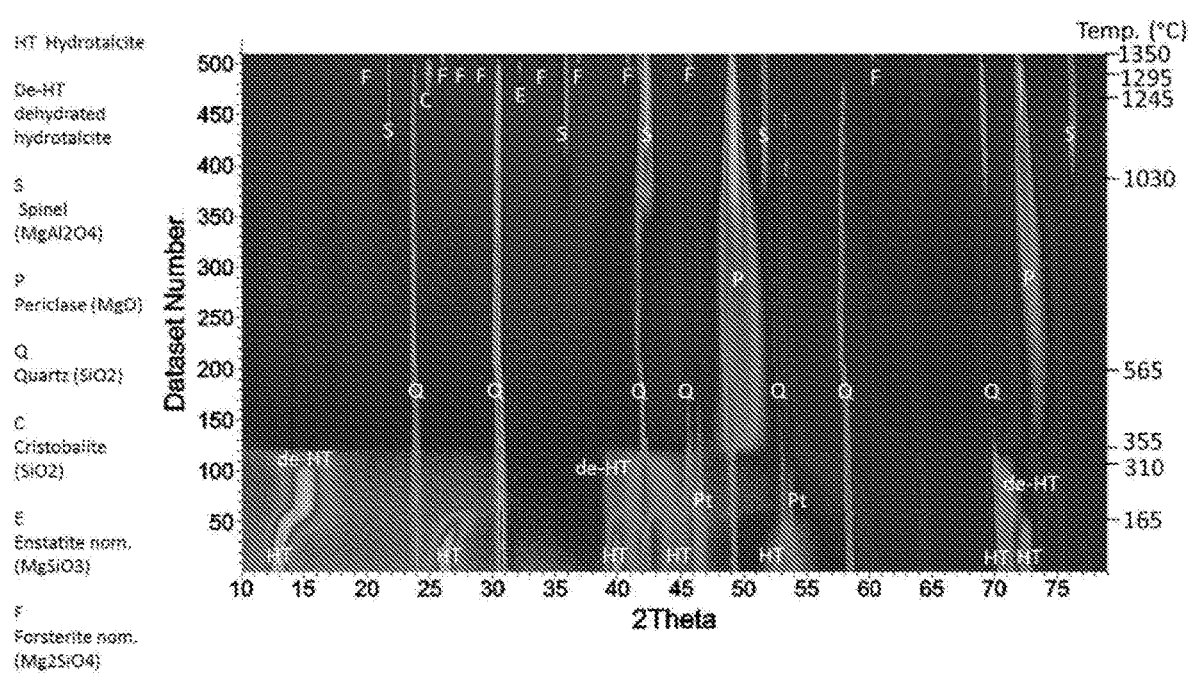
FIG. 7 depicts an integrated, grey-scale diffractogram of approximately 500 X-ray diffraction (XRD) traces collected during calcination of a hydrotalcite sample heated up to 1350° C. using a Pt strip heater in the presence of quartz.

Four samples of hydrotalcite were calcined by heating the sample up to 1350° C. with a Pt strip heater. FIGS. 6-7 depict the decomposition of the hydrotalcite samples as they undergo calcination alone or in the presence of crystalline silica (quartz), amorphous silica, and with interlayer silica, and the progressive formation of spinel (Al silicate) and periclase (Mg silicate) phases with increasing temperature.

FIG. 6 shows that hydrotalcite decomposes to a dehydrated hydrotalcite form between 330-350° C. A periclase phase begins to form between about 450-550° C. with spinel forming at around 850° C.

FIG. 7 shows that hydrotalcite in the presence of quartz decomposes to a dehydrated hydrotalcite form between 310-355° C. Quartz alpha to beta phase transformation is indicated as forming at about 550° C.; a periclase phase begins to form between about 750-800° C. with spinel forming at around 1200° C. Forsterite forms at about 1300° C. corresponding to the disappearance of quartz.

Figure 8:
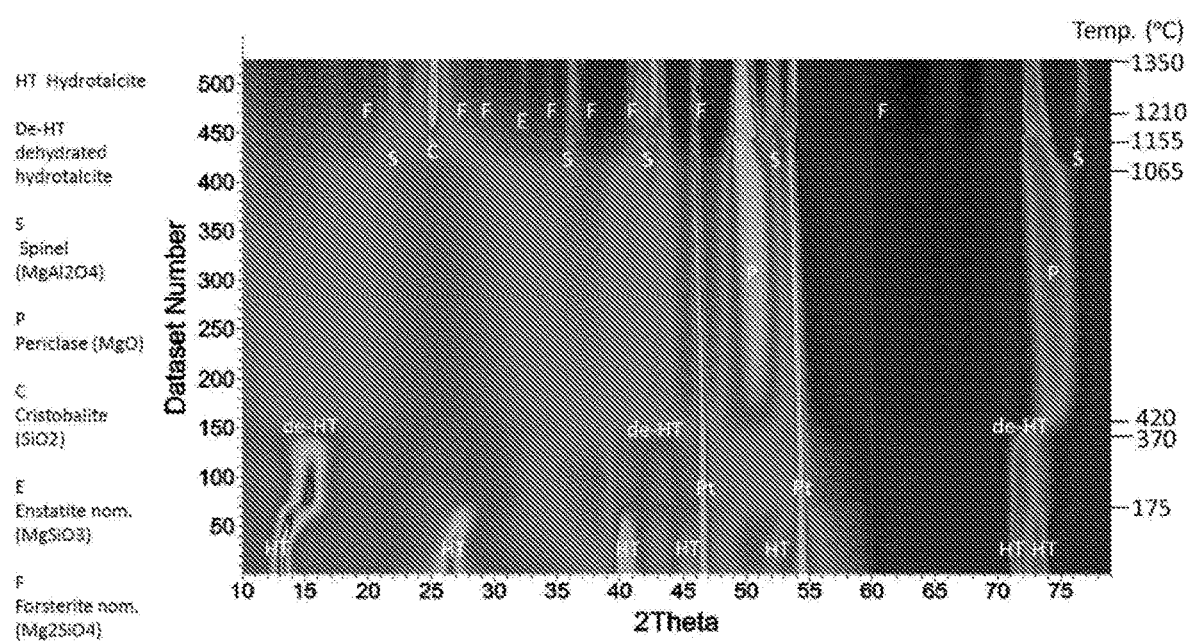
FIG. 8 depicts an integrated, grey-scale diffractogram of approximately 500 X-ray diffraction (XRD) traces collected during calcination of a hydrotalcite sample heated up to 1350° C. using a Pt strip heater in the presence of amorphous silica.

FIG. 8 shows that hydrotalcite in the presence of amorphous silica decomposes to a dehydrated hydrotalcite form between 375-425° C. A periclase phase begins to form between about 800-850° C. with spinel forming at around 1100° C. Forsterite forms at about 1210° C.

Figure 9:
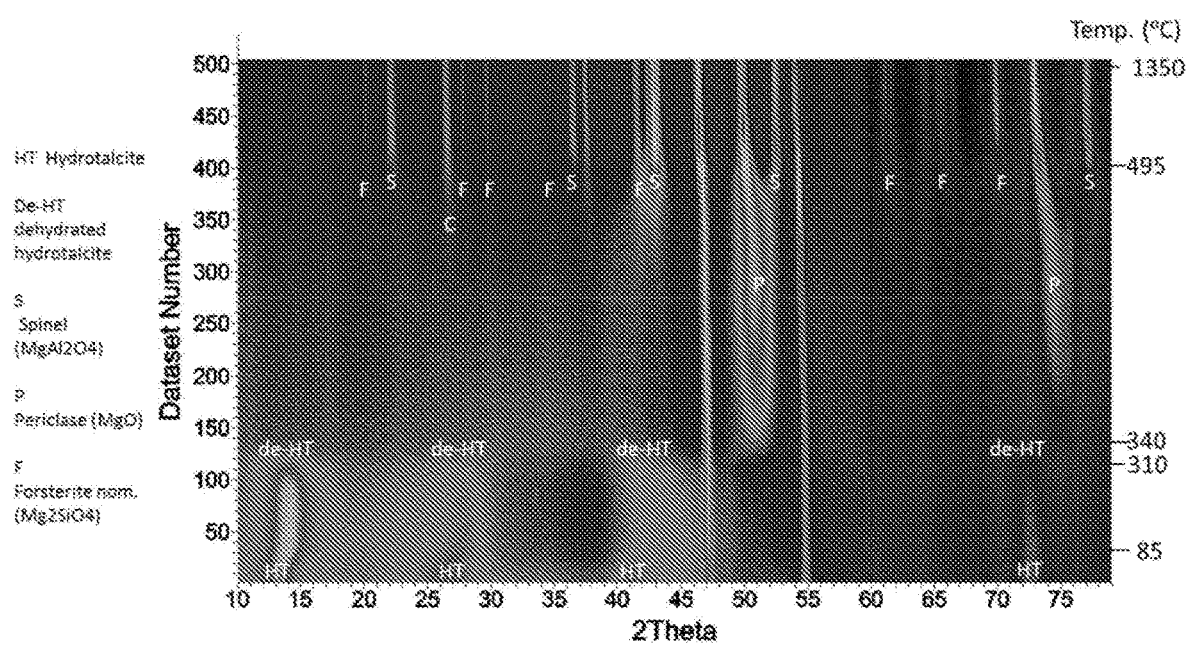
FIG. 9 depicts an integrated, grey-scale diffractogram of approximately 500 X-ray diffraction (XRD) traces collected during calcination of a hydrotalcite sample heated up to 1350° C. using a Pt strip heater in the presence of interlayer silica.

FIG. 9 shows that hydrotalcite in the presence of interlayer silica decomposes to a dehydrated hydrotalcite form between 310-340° C. A periclase phase begins to form between about 400° C. with spinel and forsterite forming at around 495° C.

Figure 10:
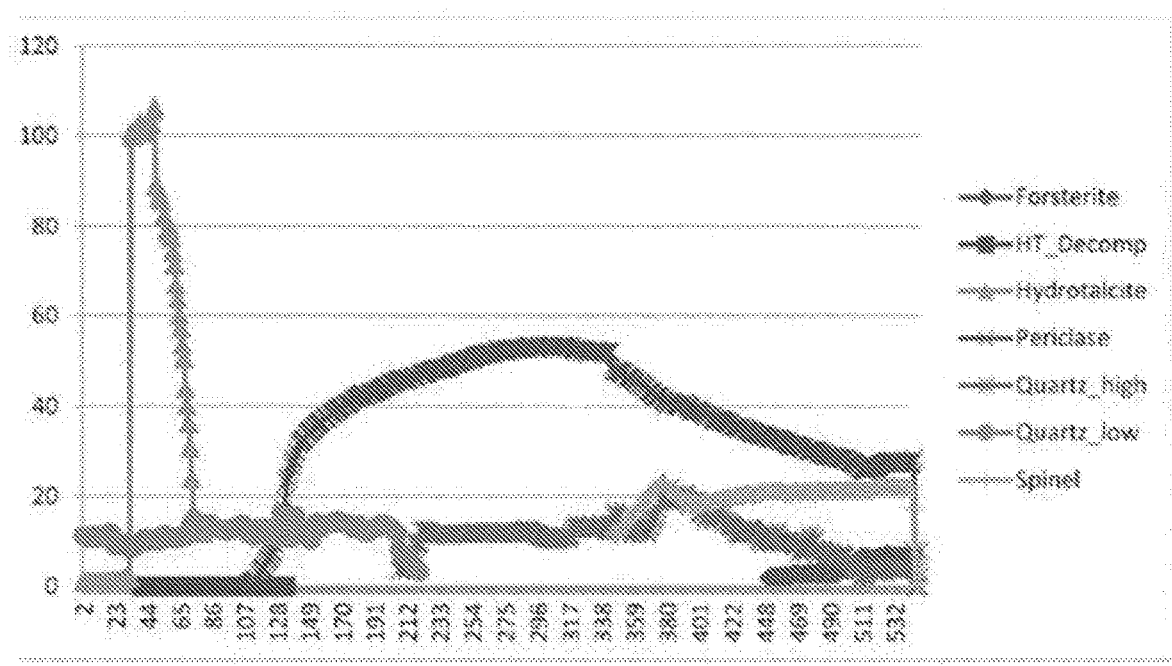
FIG. 10 is a graphical representation of the quantitative extent of hydrotalcite decomposition relative to formation of other mineral phases as a function of temperature in the presence of quartz at a silica:hydrotalcite ratio of 1:1.
Figure 11:
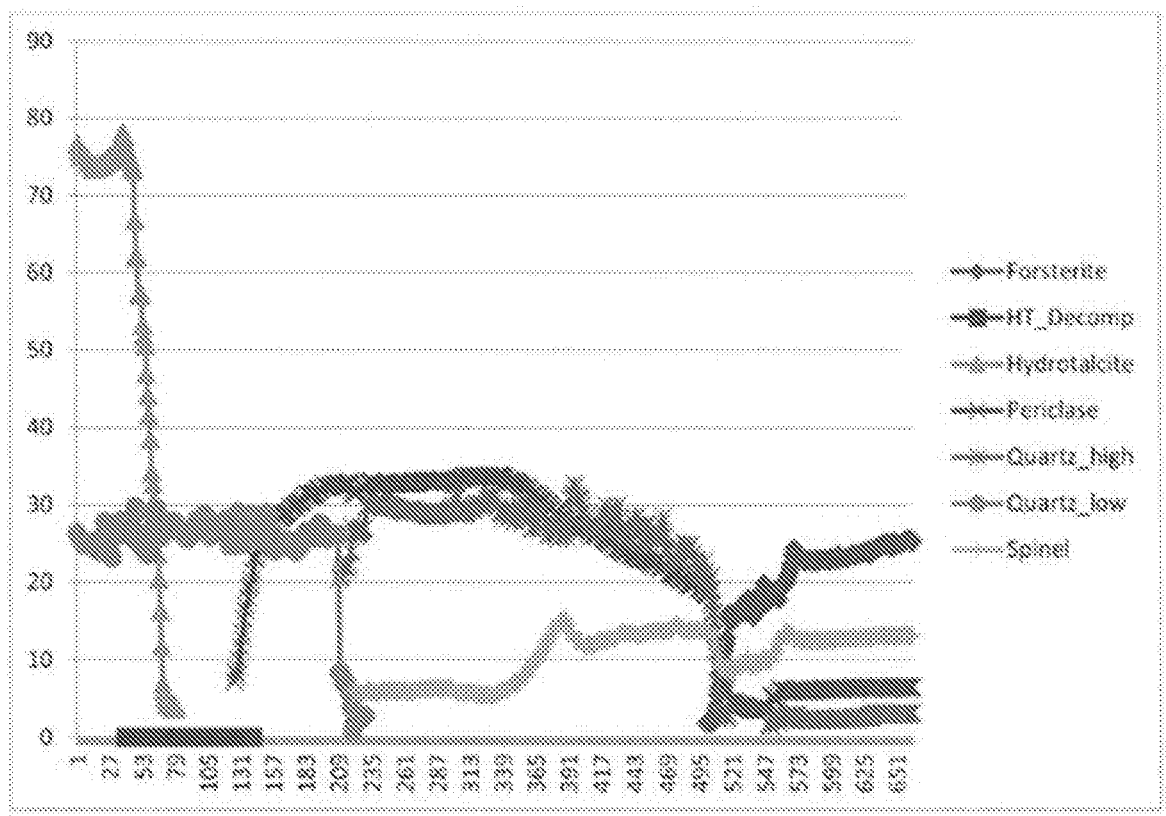
FIG. 11 is a graphical representation of the quantitative extent of hydrotalcite decomposition relative to formation of other mineral phases as a function of temperature in the presence of quartz at a silica:hydrotalcite ratio of 3:1; and, FIG. 12 is a back scattered SEM image of a calcined hydrotalcite showing a bright (high atomic mass) discrete U-bearing grain occurring discretely along with spinel and periclase grains.

The quantitative extent of decomposition of hydrotalcite and formation of other minerals as a function of temperature in the presence of quartz for different quartz: hydrotalcite ratios were also examined by heating the sample up to 1350° C. with a Pt strip heater. FIG. 10 shows the decomposition of hydrotalcite with quartz:hydrotalcite ratio of 1:1 and FIG. 11 shows the decomposition of hydrotalcite with quartz: hydrotalcite ratio of 3:1.

Figure 12:
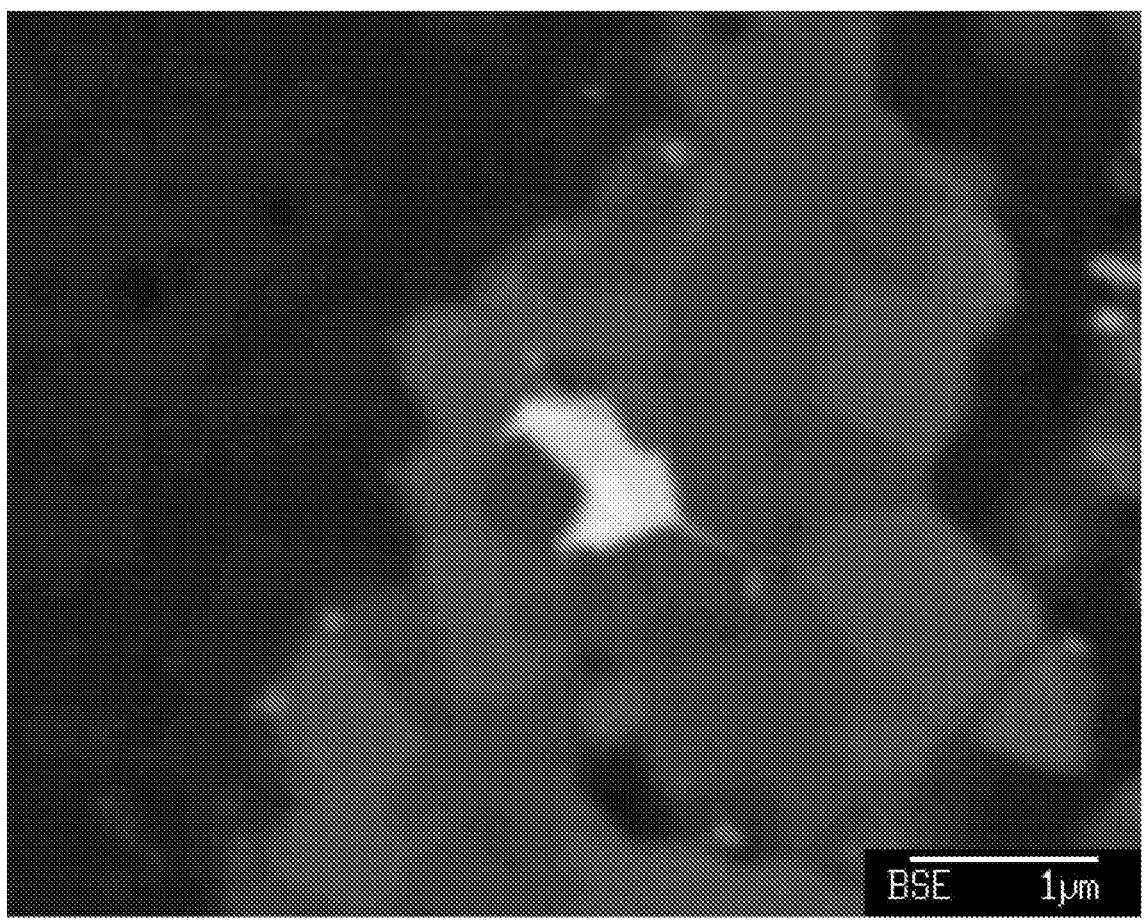

Calcination of hydrotalcite results in the mineral formation of spinel and periclase as well as element segregation. The back scatter SEM image of the bright (high atomic mass) discrete U-bearing grain is shown in FIG. 12 indicating that there is migration of U and some other elements into discrete phases during calcination.

In view of the mineral/elemental segregation, it may be possible to selectively leach the calcined hydrotalcite to remove U or, alternatively, to crush the calcined hydrotalcite and employ flotation or heavy mineral separation techniques to remove and recover U.

Example 5

The type of ambient atmosphere used to form the hydrotalcite also has an effect on the elemental uptake of U and REE in the hydrotalcite, as well as mineral segregation post-calcination. In Table 4 below is an example of the elemental uptake when the hydrotalcite was formed under an inert (e.g. nitrogen ($N_2$)) or a reducing (e.g. carbon dioxide ($CO_2$)) atmosphere.

TABLE 4

| Element | Mean $N_2$ | Mean $CO_2$ |
|---------|-----------|-------------|
| Al | 1.68 | 10.10 |
| Mg | 7.56 | 20.34 |
| U | 18.28 | 7.73 |
| Fe | 2.31 | 8.07 |
| Th | 16.85 | 1.09 |
| Si | 0.51 | 3.22 |
| Y | 2.75 | 0.46 |
| Ca | 0.29 | 9.49 |
| Ce | 32.75 | 5.42 |
| O | 18.76 | 34.39 |
| Total | 101.56 | 100.31 |

Example 6

Table 5 below shows the selective separation of U from a synthetic raffinate containing uranium, and two rare earth elements, lanthanide and yttrium by formation of a Fe(II)/Fe(III) LDH material. The concentration of Al, Mg, Fe, U, La and Y in the synthetic raffinate is shown in the second column of Table 5. The concentration of Al, Mg, Fe, U, La and Y remaining in the solution following formation of the Fe(II)/Fe(III) LDH material is shown in the third column of Table 5.

Additional Mg(II) in the form of $MgCl_2.6H_2O$ was added to adjust the $M^{2+}:M^{3+}$ cation ratio to about 2.5 so as to cause formation of Fe(II)/Fe(III) LDH material. The precipitate so formed was a blue-green colour which is characteristic of Fe(II)/Fe(III) LDH material containing mixed Fe valency.

Formation of the Fe(II)/Fe(III) LDH material results in uptake of substantially all of the uranium, lanthanide and yttrium from the synthetic raffinate.

TABLE 5

| Sample | Synthetic raffinate | Fe(II)/Fe(III) LDH |
|--------|--------------------|--------------------|
| Al | 3183 | <0.1 |
| Mg | 919 | 1.7 |
| Fe | 15499 | 1.7 |
| U | 183 | <0.5 |
| La | 73.7 | 0.1 |
| Y | 25.9 | <0.1 |

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

It is to be understood that the embodiments are not limited to specific features shown or described since the means herein described comprises preferred forms of putting the embodiments into effect. The embodiments are, therefore, claimed in any of its forms or modifications within the proper scope of the appended claims (if any) appropriately interpreted by those skilled in the art.

The invention claimed is:

1. A process for selectively separating a metallic constituent from one or more other elements and other materials accompanying the metallic constituent in a mixture, the process comprising:
   (a) providing the mixture in an aqueous solution such that the metallic constituent forms a complex anion selected from the group consisting of a uranyl complex anion, a vanadyl complex anion, a chromium complex anion, a transuranic complex anion, and a radionuclide complex anion in the aqueous solution and wherein the one or more other elements forms a cation or a complex cation in the aqueous solution;
   (b) contacting the aqueous solution with one or more additives to form layered double hydroxide (LDH) material in situ such that the complex anion is intercalated within interlayers of the LDH material to form an intercalated complex anion, and introducing additional additives comprising bicarbonates or carbonates into the aqueous solution to optimize a crystal structure or matrix of the LDH material, wherein the one or more other elements are selectively incorporated into the crystal structure or matrix of the LDH material;
   (c) after (b), separating the LDH material from the aqueous solution; and
   (d) after (c), selectively recovering the metallic constituents from the interlayers of the LDH material by subjecting the LDH material obtained from step (c) to a recovery treatment step; wherein the selectively recovering comprises:
      (I) subjecting the LDH material to heat treatment or thermal decomposition in an anoxic, reducing, inert or oxidizing gas, thereby forming a collapsed or metastable LDH material and resulting in formation of a first oxide material comprising the metallic constituent, a second oxide material comprising the one or more other elements, or a third material comprising the metallic constituent and the one or more other elements; or
      (II) subjecting the LDH material to ion exchange by adding the LDH material and at least one substituent agent to an ion-exchanging solution such that the at least one substituent agent displaces at least some of the intercalated complex anion by an ion exchange mechanism thereby resulting in the intercalated complex anion being released from the interlayers into the ion-exchanging solution, wherein the ion exchange comprises controlling pH conditions of the ion-exchanging solution.

2. A process in accordance with claim 1 wherein the metallic constituent comprises uranium, vanadium, chromium or a transuranic element or radionuclide capable of forming the complex anion in the aqueous solution and wherein the one or more other elements comprises one or more metals selected from the group consisting of Cu, Mn, Ni, Pb, Zn and rare earth metals.

3. A process in accordance with claim 1 wherein the step of contacting the solution with one or more additives to form layered double hydroxide (LDH) material in situ further comprises:
   (i) adding a magnesium and/or aluminium containing silicate material to the aqueous solution and dissolving at least a part of the silicate material in the solution thereby leaching at least a part of the magnesium and/or aluminium from the silicate material into the solution; and
   (ii) controlling reaction conditions for achieving an appropriate Mg:Al ratio in the solution for formation of the layered double hydroxide (LDH) material in situ.

4. A process in accordance with claim 3 wherein the step of controlling the reaction conditions comprises addition of at least one Mg-containing compound and/or at least one Al-containing compound for achieving the appropriate Mg:Al ratio in the solution for formation of the LDH material in situ.

5. A process in accordance with claim 4 further comprising the step of removing at least a part of the LDH material formed in situ, wherein the at least one of the said dissolved cation and/or anion species comprising magnesium and/or aluminium is incorporated in the LDH material.

6. A process in accordance with claim 3 wherein the step of controlling the reaction conditions further comprises providing substantially alkaline reaction conditions for formation of the LDH material in situ.

7. A process in accordance with claim 3 wherein the step of controlling the reaction conditions further comprises addition of alkaline or acid-neutralising material for formation of the LDH material in situ.

8. A process in accordance with claim 3 wherein the silicate material is one or more of: Attapulgite; Clinoptilolite; Sepiolite; Talc; or Vermiculite.

9. A process in accordance with claim 3 wherein at least a part of the silicate material from step (i) and the LDH material formed in situ in step (ii) form an insoluble clay material mixture wherein the insoluble clay material mixture incorporates said cation or complex cation in the solution and/or complex anion in the solution.

10. A process in accordance with claim 3 wherein undissolved parts of the silicate material comprise undissolved clay material particles from step (i) and provide nucleation sites for formation of at least a part of the LDH material formed in situ in step (ii).

11. A process in accordance with claim 3 wherein the cation or complex cation in the solution comprises magnesium and/or aluminium cations such that the magnesium and/or aluminium is incorporated into the interlayers of the LDH material formed in situ.

12. A process in accordance with claim 3 wherein step (i) further comprises adding an additional material to a mixture comprising the silicate material.

13. A process in accordance with claim 1 wherein the LDH material formed in situ comprises hydrotalcite.

14. A process in accordance with claim 1 wherein the substituent agent is selected from the group consisting of: nitrilotriacetic acid (NTA), ethylenediaminetetraacetic acid (EDTA), a crown ether or other organic or (complex) inorganic ligand.

15. A process in accordance with claim 1 wherein the substituent agent is more electronegative relative to the complex anion intercalated in the LDH material.

16. A process in accordance with claim 1, further comprising, after (II), separating the LDH material to obtain a separated LDH material comprising the one or more other elements incorporated into the crystal structure or matrix of the separated LDH material; and
   subjecting the separated LDH material to heat treatment or thermal decomposition to recover the one or more other elements.

17. A process in accordance with claim 16, further comprising, prior to or during the heat treatment or thermal decomposition of the separated LDH material, adding a further additive to the separated LDH material.

18. A process in accordance with claim 17, further comprising controlling a ratio of the further additive to the separated LDH material.

19. A process in accordance with claim 17, wherein the further additive comprises crystalline silica, amorphous or chemically-precipitated silica, silicic acid, tetra-ethylsilica(te), or silica added to the LDH interlayers.

20. A process for selectively separating a metallic constituent from one or more other elements and other materials accompanying metallic constituent in a mixture, the process comprising:
   (a) providing the mixture in an aqueous solution such that the metallic constituent forms a complex anion selected from the group consisting of a uranyl complex anion, a vanadyl complex anion, a chromium complex anion, a transuranic complex anion, and a radionuclide complex anion in the aqueous solution and wherein the one or more other elements forms a cation or a complex cation in the aqueous solution;
   (b) contacting the aqueous solution with a layered double hydroxide (LDH) material such that the complex anion is intercalated within interlayers of the LDH material, and introducing additives comprising bicarbonates or carbonates into the aqueous solution to optimize a crystal structure or matrix of the LDH material, wherein the one or more other elements are selectively incorporated into the crystal structure or matrix;
   (c) after (b), separating the LDH material from the aqueous solution; and
   (d) after (c), selectively recovering the metallic constituent from the interlayer of the LDH material by subjecting the LDH material from step (b) to a recovery treatment step; wherein the selectively recovering step comprises:
   (I) subjecting the LDH material to heat treatment or thermal decomposition in an anoxic, reducing, inert or oxidizing gas, thereby forming a collapsed or metastable LDH material and resulting in formation of a first oxide material comprising the metallic constituent, a second oxide material comprising the one or more other elements, and a third material, or further mineral phases, comprising the metallic constituent and the one or more other elements; or
   (II) subjecting the LDH material to ion exchange by adding the LDH material and one or more substituent agents to an ion-exchanging solution such that the one or more substituent agents displaces at least some of the intercalated complex anion by an ion exchange mechanism, thereby resulting in the intercalated complex anion being released from the interlayers into the ion-exchanging solution, wherein the ion-exchange comprises controlling pH conditions of the ion-exchanging solution.

21. A process in accordance with claim 20 wherein the step of contacting the LDH material with the aqueous solution comprises dissolving at least a part of the LDH material into the solution thereby obtaining dissolved LDH material in the solution followed by controlling the reaction conditions in the aqueous solution for in situ precipitation of LDH material formed in situ from the dissolved LDH material such that the complex anion is intercalated within interlayers of the LDH material formed in situ and wherein one or more of the other elements are incorporated into a crystal structure or matrix of the LDH material formed in situ.

* * * * *